(12) United States Patent
Sato et al.

(10) Patent No.: US 8,945,454 B2
(45) Date of Patent: Feb. 3, 2015

(54) SUBSTRATE MANUFACTURING METHOD, SUBSTRATE MANUFACTURED BY THE SUBSTRATE MANUFACTURING METHOD AND MAGNETIC RECORDING MEDIUM USING THE SUBSTRATE

(75) Inventors: Akira Sato, Ritto (JP); Takayuki Okano, Moriyama (JP)

(73) Assignee: Konica Minolta Opto, Inc., Tokyo (JP)

( * ) Notice: Subject to any disclaimer, the term of this patent is extended or adjusted under 35 U.S.C. 154(b) by 213 days.

(21) Appl. No.: 13/059,763

(22) PCT Filed: Aug. 13, 2009

(86) PCT No.: PCT/JP2009/064304
§ 371 (c)(1),
(2), (4) Date: Feb. 18, 2011

(87) PCT Pub. No.: WO2010/021291
PCT Pub. Date: Feb. 25, 2010

(65) Prior Publication Data
US 2011/0177361 A1  Jul. 21, 2011

(30) Foreign Application Priority Data
Aug. 22, 2008 (JP) .................... 2008-213815

(51) Int. Cl.
*B32B 3/30* (2006.01)
*B29C 59/00* (2006.01)
(Continued)

(52) U.S. Cl.
CPC ................ *G11B 5/855* (2013.01); *B29C 59/00* (2013.01); *B32B 3/30* (2013.01)
USPC .......... 264/293; 264/219; 264/241; 428/847.1

(58) Field of Classification Search
CPC .......... B23B 3/30; B29C 59/00; B29C 61/02; G11B 5/855

USPC ........... 264/1.1, 1.31, 1.6, 1.5, 216, 219, 241, 264/299, 293, 320, 345, 496, 104, 132, 232, 264/279.1; 427/163.1, 220, 256; 428/847.1, 428/202, 402, 98; 425/385, 810
See application file for complete search history.

(56) References Cited

U.S. PATENT DOCUMENTS 7,854,864 B2 * 12/2010 Sato et al. ............ 264/1.6
2003/0219992 A1 * 11/2003 Schaper ................ 438/748
(Continued)

FOREIGN PATENT DOCUMENTS

JP    5-225559 A    9/1993
JP    6-139566 A    5/1994
(Continued)

*Primary Examiner* — Kevin Bernatz
*Assistant Examiner* — Louis Falasco
(74) *Attorney, Agent, or Firm* — Cozen O'Conner

(57) ABSTRACT

Disclosed is a method for manufacturing a substrate provided with a surface portion having a plurality of concave and convex configurations. The method includes a step of applying a solution between a mold having a configuration corresponding to the concave and convex configurations, and a substrate base member, the solution obtained by dissolving a constructional material for composing the surface portion in a solvent; a step of forming the surface portion by drying the solvent in a state that the solution is applied between the mold and the substrate base member; and a step of releasing the mold from the surface portion. The mold satisfies requirements that a contact angle of a contact portion of the mold to be contacted with the solution is smaller than 90° with respect to the solvent, and that a work of adhesion between the contact portion and the constructional material is smaller than a work of adhesion between the contact portion and the solvent.

18 Claims, 11 Drawing Sheets

(51) Int. Cl.
    *G11B 5/855*     (2006.01)
    *G11B 5/74*     (2006.01)

(56) References Cited

U.S. PATENT DOCUMENTS

| | | | | |
|---|---|---|---|---|
| 2004/0028875 | A1* | 2/2004 | Van Rijn et al. | 264/1.1 |
| 2004/0089979 | A1* | 5/2004 | Rubin | 264/293 |
| 2005/0156353 | A1* | 7/2005 | Watts et al. | 264/293 |
| 2006/0001194 | A1* | 1/2006 | Cherala et al. | 264/320 |
| 2007/0072013 | A1 | 3/2007 | Haginoya et al. | 428/847.1 |
| 2007/0120292 | A1* | 5/2007 | Hattori et al. | 264/293 |
| 2007/0252293 | A1* | 11/2007 | Sato et al. | 264/1.31 |
| 2007/0264481 | A1* | 11/2007 | DeSimone et al. | 427/256 |
| 2008/0073323 | A1* | 3/2008 | Full et al. | 264/219 |
| 2008/0095992 | A1* | 4/2008 | Hirschfelder et al. | 264/1.7 |
| 2008/0137188 | A1* | 6/2008 | Sato et al. | 427/163.1 |
| 2008/0251976 | A1* | 10/2008 | Rolland et al. | 264/241 |
| 2009/0008808 | A1* | 1/2009 | Takahashi et al. | 264/1.7 |
| 2009/0028910 | A1* | 1/2009 | DeSimone et al. | 264/5 |

FOREIGN PATENT DOCUMENTS

| | | | | |
|---|---|---|---|---|
| JP | 2004-79098 A | 3/2004 | | |
| JP | 2004-288811 A | 10/2004 | | |
| JP | 2006-31852 A | 2/2006 | | |
| JP | 2007-95162 A | 4/2007 | | |
| JP | 2007-301839 A | 11/2007 | | |
| JP | 2008-159146 A | 7/2008 | | |
| WO | 2006092987 | * | 8/2006 | B29K 45/00 |
| WO | WO 2010/021291 A1 | 2/2010 | | |

* cited by examiner

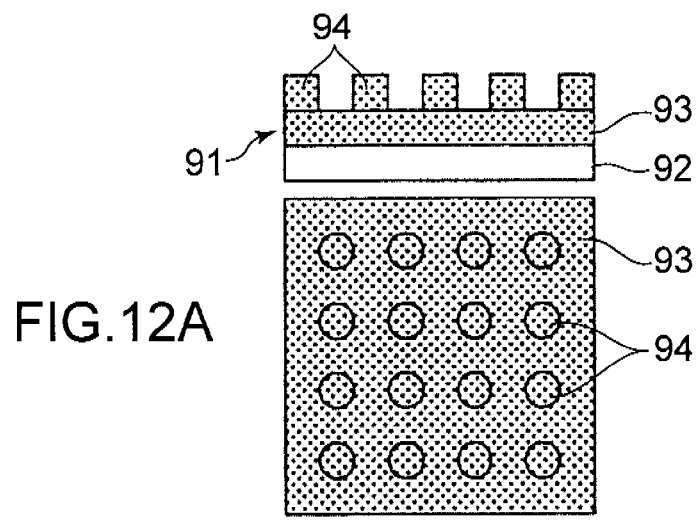
FIG.12A
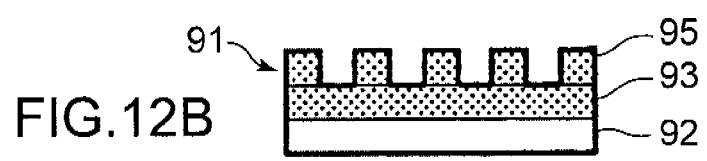
FIG.12B
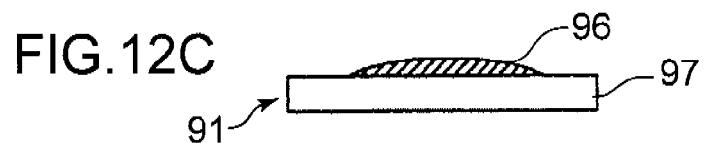
FIG.12C
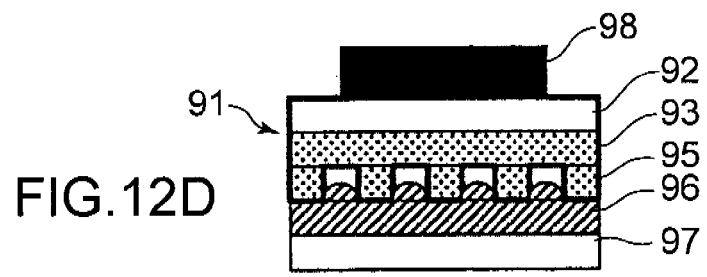
FIG.12D
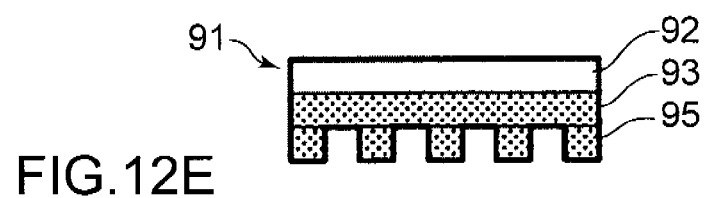
FIG.12E

SUBSTRATE MANUFACTURING METHOD, SUBSTRATE MANUFACTURED BY THE SUBSTRATE MANUFACTURING METHOD AND MAGNETIC RECORDING MEDIUM USING THE SUBSTRATE

RELATED APPLICATIONS

This is a U.S. National Stage under 35 U.S.C. §371 of International Application No. PCT/JP2009/064304, filed in the Japanese Patent Office on Aug. 13, 2009, and claims priority on Japanese Application No. 2008-213815, filed on Aug. 22, 2008.

TECHNICAL FIELD

The present invention relates to a substrate manufacturing method, a substrate manufactured by the substrate manufacturing method, and a magnetic recording medium using the substrate.

BACKGROUND ART

As an example of a magnetic recording medium, there has been proposed a patterned medium (PM), wherein a magnetic layer is physically divided into plural areas by patterning the magnetic layer to increase the recording density. Examples of the PM manufacturing method include a method, wherein a magnetic layer is formed on a substrate, followed by patterning the magnetic layer; and a method, wherein a substrate of a magnetic recording medium is patterned, followed by forming a magnetic layer on the patterned substrate to thereby form the magnetic layer having a pattern corresponding to the pattern of the substrate.

The method, wherein a magnetic layer is formed on a substrate, followed by patterning the magnetic layer, has a problem that the magnetic layer may be deteriorated by e.g. etching at the time of patterning. In order to solve the problem, there has been proposed an idea of forming a protective layer for protecting the magnetic layer on the magnetic layer before patterning is performed. For instance, patent literature 1 discloses a recording medium manufacturing method including: forming a recording material layer (magnetic layer) on a medium substrate; forming a resist layer (protective layer) on the recording material layer; pressing an imprint master (mold) against the resist layer to transfer concave and convex configurations on a surface of the imprint master onto the resist layer; depositing particles of masking material in concaves formed in the resist layer; and patterning the resist layer and the recording material layer, using the particles of masking material as a mask to form a patterned recording layer. However, adding a step of forming a protective layer on a magnetic layer makes the manufacturing process cumbersome and makes it difficult to achieve high throughput. Dry-etching is used in the above etching step. Dry-etching is normally performed under a vacuum condition. Therefore, in performing etching, the interior of the apparatus is required to be brought to a vacuum state, which hinders achieving high throughput.

For instance, as an example of a method for patterning a substrate of a magnetic recording medium, patent literature 2 discloses a pattern forming method including: coating, on a substrate, a diblock copolymer film containing two polymeric components having different etching resistances; subjecting the diblock copolymer film to phase-separation to form one of the polymeric components into a cylinder or a lamella; applying an imprint on the diblock copolymer film, using an imprint mold having a line pattern; forming first concaves intersecting with the length direction of the cylinder or the lamella; forming second concaves by removing the polymeric component in the form of the cylinder or the lamella; embedding a silicon-containing resist into the first and the second concaves; etching the diblock copolymer film, using the silicon-containing resist as a masking material, followed by etching the substrate. In the above technology, a substrate is etched to form a pattern, using a silicon-containing resist as a masking material. The above technology may cause a drawback called "micro loading effect" that the etching rate is changed depending on the degree of density of the pattern. Normally, there exist, as a pattern for PM, a pattern for use in data recording, and a servo pattern for use in tracking data; and the configurations of the respective patterns differ from each other. In other words, since the micro loading effect occurs in the above technology, it has been difficult to uniformly process all the patterns having different configurations.

Further, in performing etching, the following drawback may occur, in the case where e.g. a general reactive ion etching (RIE) is used as dry-etching. RIE is a method for etching a surface of an object to be processed by colliding radicals or ions generated by plasma discharge against the object to be processed. The distance between adjacent convexes of a pattern for PM is normally as small as several ten nanometers, and the distance is required to be further reduced in order to enhance the recording density. In the case where a pattern having such a small convex-to-convex distance is formed, the size of the openings of a mask to be used in etching becomes extremely small. With such excessively small openings of the mask, it has been difficult to perform etching, because radicals or ions are less likely to be intruded into the mask. Further, since the above method also uses dry-etching, the above method has not been suitable for achieving high throughput.

In view of the above, there has been proposed a method for forming a pattern by a nano imprint method, as a method for solving the above drawbacks. As a method for forming a pattern by a nano imprint method, for instance, patent literature 3 discloses a method for manufacturing a magnetic recording medium including: a step of forming a member to be transferred (imprint material) on a flat substrate or on a mold having a concave and convex structure; a step of pressingly contacting the mold against the member to be transferred; a step of transferring the concave and convex structure of the mold onto the member to be transferred; a step of removing the mold from the member to be transferred; and a step of depositing and forming a magnetic recording layer on the member to be transferred and having a structure corresponding to the concave and convex structure of the mold. Specifically, the nano imprint method is a method including: pressing a mold having concave and convex configurations on a surface thereof against an imprint material coated on a substrate base member to transfer the concave and convex configurations onto the imprint material, and solidifying the imprint material, followed by removing the mold to thereby acquire a substrate having concave and convex configurations on the surface thereof.

Use of the nano imprint method as disclosed in patent literature 3 enables to realize high throughput, because the number of steps is small as compared with a case of performing etching, for instance, manufacturing can be performed under an atmospheric condition, which does not require a step of bringing the interior of the apparatus to a vacuum state.

However, in the nano imprint method as described above, it has been difficult to satisfy both of the requirements on chargeability of an imprint material into a mold and releasability of the mold, after concave and convex configurations are transferred to the imprint material.

Specifically, if the nano imprint method is performed without applying a specific process to the mold, a releasability-related problem may occur, namely, the imprint material is likely to remain in e.g. the concave and convex configurations of the mold in releasing the mold from the imprint material after the concave and convex configurations are transferred. If a substrate is fabricated in a state that the imprint material remains in the mold, it is impossible or difficult to obtain intended concave and convex configurations on the fabricated substrate. This requires manufacturing a mold again, which may lower the throughput, and increase the manufacturing cost.

There is proposed an idea of coating e.g. a fluorine-based parting agent on a mold in advance in order to solve the releasability-related problem. Since the parting agent repels the imprint material, the imprint material is less likely to remain in the mold at the time of releasing the mold from the imprint material after concave and convex configurations are transferred. However, since the fluorine-based parting agent is coated on the mold in advance, a chargeability-related problem may occur, namely, the imprint material is likely to be repelled by the parting agent even if the mold is pressed against the imprint material, and the imprint material may not be sufficiently charged into the concaves of the mold.

As described above, in the conventional nano imprint method, it has been difficult to satisfy both of the requirements on chargeability of an imprint material, and releasability of a mold.

CITATION LIST

Patent Literature

Patent literature 1: JP 2004-79098A
Patent literature 2: JP 2007-301839A
Patent literature 3: JP2007-95162A

SUMMARY OF INVENTION

In view of the above, an object of the invention is to provide, in a nano imprint method, a substrate manufacturing method that enables to satisfy both of the requirements on chargeability and mold releasability without providing an additional step such as a mold releasing process. Another object of the invention is to provide a substrate manufactured by the substrate manufacturing method, and a magnetic recording medium incorporated with the substrate.

A substrate manufacturing method according to an aspect of the invention is a method for manufacturing a substrate provided with a surface portion having a plurality of concave and convex configurations. The substrate manufacturing method includes a step of applying a solution between a mold having a configuration corresponding to the concave and convex configurations, and a substrate base member, the solution being obtained by dissolving a constructional material for composing the surface portion in a solvent; a step of forming the surface portion by drying the solvent in a state that the solution is applied between the mold and the substrate base member; and a step of releasing the mold from the surface portion, wherein the mold satisfies requirements that a contact angle of a contact portion of the mold to be contacted with the solution is smaller than 90° with respect to the solvent, and that a work of adhesion between the contact portion and the constructional material is smaller than a work of adhesion between the contact portion and the solvent.

With the manufacturing method, it is possible, in the nano imprint method, to satisfy both of the requirements on chargeability and mold releasability, without providing an additional step such as a mold releasing process. Further, since there is no need of providing an additional step such as a mold releasing process, high throughput can be realized.

These and other objects, features and advantages of the present invention will become more apparent upon reading the following detailed description along with the accompanying drawings.

BRIEF DESCRIPTION OF DRAWINGS

FIGS. 12A through 13E are diagrams showing a substrate manufacturing method as Comparative Example 4.

DESCRIPTION OF EMBODIMENTS

Figure 1:
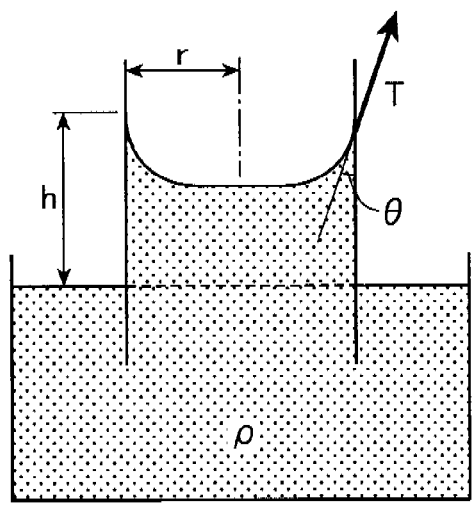
FIG. 1 is a diagram showing an exemplified state of a capillary phenomenon.

In the following, the invention is described by an embodiment of the invention. The following embodiment is merely an example embodying the invention, and does not limit the technical scope of the invention.

A substrate manufacturing method of the embodiment is a method for manufacturing a substrate provided with a surface portion having plural concave and convex configurations. Specifically, the substrate manufacturing method is a substrate manufacturing method by a so-called nano imprint method, which includes a step of applying a solution obtained by dissolving a constructional material for composing the surface portion in a solvent, between a mold having a configuration corresponding to the concave and convex configurations, and a substrate base member; a step of forming the surface portion by drying the solvent in a state that the solution is applied between the mold and the substrate base member; and a step of releasing the mold from the surface portion. The mold is a mold satisfying the requirements that the contact angle of a contact portion of the mold to be contacted with the solution is smaller than 90° with respect to the solvent, and that the work of adhesion W1 between the contact portion and the constructional material is smaller than the work of adhesion W2 between the contact portion and the solvent. Specifically, the substrate manufacturing method of the embodiment is a method of using, in a nano imprint method, a mold, a constructional material, and a solvent, and satisfying the requirements that the contact angle of the contact portion with respect to the solvent is smaller than 90°, and that the work of adhesion W1 between the contact portion and the constructional material is smaller than the work of adhesion W2 between the contact portion and the solvent.

According to the above manufacturing method, since the contact angle of the contact portion with respect to the solvent is smaller than 90°, it is possible to sufficiently charge the solution, which is an imprint material before drying, into the concave and convex configurations of the mold. Further, since the work of adhesion W1 between the contact portion and the constructional material is smaller than the work of adhesion W2 between the contact portion and the solvent, it is possible to easily release the mold from the surface portion composed of the constructional material, which is an imprint material after drying. Accordingly, the method of the embodiment enables to, in the nano imprint method, satisfy both of the requirements on chargeability and mold releasability, without providing an additional step such as a mold releasing process. Further, since there is no need of providing an additional step such as a mold releasing process, high throughput can be realized.

As far as the substrate has plural concave and convex configurations on a surface thereof, any substrate can be used. For instance, a substrate for a patterned magnetic recording medium (patterned medium: PM) may be used. Further, the concave and convex configurations are fine concave and convex configurations such as concave and convex configurations of nanometer order.

Further, the mold has a configuration corresponding to the concave and convex configurations. The contact angle of a contact portion of the mold to be contacted with the solution is smaller than 90° with respect to the solvent. With use of the mold having the above structure, it is possible to sufficiently charge the solution, which is an imprint material before drying, into the concave and convex configurations of the mold. Conceivably, the above advantage is obtained based on the following findings. The primary component of the solution is the solvent, before the solvent is dried. Accordingly, chargeability of the solution into the concave and convex configurations of the mold can be changed depending on the compatibility between the contact portion and the solvent. If the contact angle of the contact portion with respect to the solvent is smaller than 90°, generally, a state between the contact portion and the solvent is an immersional wetting state, and the solution is well wet and spread over the contact portion. Accordingly, it is conceived that chargeability of the solution can be sufficiently enhanced.

In this section, a phenomenon that a solution is well wet under the condition that the contact angle is smaller than 90° is described in detail by using a capillary phenomenon as an example. The capillary phenomenon is a phenomenon that the liquid surface within a capillary tube is raised or lowered as compared with the liquid surface outside the capillary tube by surface tension.

For instance, in the case of the state as shown in FIG. 1, a force of raising a liquid is a component, of a surface tension acting on an inner surface of a capillary tube, in parallel to a wall surface of the capillary tube. Specifically, the force is expressed by $2\pi r \times T \cos \theta$. FIG. 1 is a diagram showing an exemplified state of a capillary phenomenon, where r denotes a radius of a capillary tube, T denotes a surface tension, and θ denotes a contact angle of a liquid with respect to the capillary tube.

A force for lowering a liquid is a gravitational force acting on the raised liquid. Specifically, the gravitational force is expressed by $\pi r^2 \times h \times \rho \times g$, where r denotes a radius of a capillary tube, h denotes a height of a raised liquid (height difference between the liquid surface within the capillary tube and the liquid surface outside the capillary tube), ρ denotes a density of the liquid, and g denotes a gravitational acceleration.

When the liquid surface within the capillary tube does not move any more, the force for raising the liquid and the force for lowering the liquid are equal to each other. Accordingly, the height "h" by which the liquid is raised (height of the raised liquid) is calculated by the following equation (1).

$$h = 2T \cos \theta / \gamma \rho g \quad (1)$$

where T, θ, r, ρ, and g are each a positive value.

In the case where the contact angle θ is smaller than 90°, $\cos \theta > 0$, and $h > 0$. In other words, the liquid surface is raised.

The above shows that a region that has not been wet is being wet by a surface tension against the gravitational force. The above shows that in the case where the contact angle θ is smaller than 90°, a liquid moves in a direction of wetting and spreading by a surface tension.

Conversely, in the case where the contact angle θ is equal to or larger than 90°, $\cos \theta \leq 0$, and $h \leq 0$. In other words, the liquid surface is not raised.

The above shows that a region that has been wet is not wet any more by a surface tension. The above shows that in the case where the contact angle θ is equal to or larger than 90°, a liquid does not move in a direction of wetting and spreading by a surface tension.

The wettability is enhanced, if the roughness of a surface where a solution is coated is slightly increased from the above immersional wetting state. For instance, let it be assumed that a 2.5-inch substrate, which is generally used as a magnetic recording medium, is used as a substrate base member. The substrate base member has an annular shape with 65 mm-outer diameter and 20 mm-inner diameter, and the concave and convex configurations for PM are such that the distance between adjacent convexes is several ten nanometers, which corresponds to a state that the roughness of the surface to be coated is slightly increased. In this state, since the wettability is enhanced, chargeability is also enhanced. Further, the immersional wetting state is actually determined by the size of a region which is wet and spread with a given amount of solution when e.g. the solution is applied between two plate-shaped members. As a principle, however, the solution is indefinitely wet and spread. Therefore, the above idea is suitable in the aspect of securing good chargeability, even if the areas of a substrate and a mold are large.

Further, the mold satisfies a requirement that the work of adhesion W1 between a contact portion of the mold to be contacted with the solution, and the constructional material is smaller than the work of adhesion W2 between the contact portion and the solvent. With use of the mold satisfying the above requirement, it is possible to easily release the mold from the surface portion composed of the constructional material, which is an imprint material after drying. Conceivably, the above advantage is obtained based on the following findings. The primary component of the solution is the constructional material, after the solvent in the solution is dried. Accordingly, releasability of the mold can be changed depending on the compatibility between the contact portion and the constructional material. If the work of adhesion W1 between the contact portion and the constructional material is smaller than the work of adhesion W2 between the contact portion and the solvent, affinity of the solution, which is an imprint material before drying, for the contact portion is high, because the contact angle of the contact portion with respect to the solvent is smaller than 90°. However, after the solvent is dried, it is easy to remove the constructional material, which is an imprint material after drying, from the contact portion. Specifically, as far as the works of adhesion satisfy the above requirement, it is possible to easily remove a surface portion composed of the constructional material from a mold, without using e.g. a parting agent. A work of adhesion is an energy required to release a substance from another substance from a state that these substances are adhered to each other. The fact that the work of adhesion is large means that the adhesion of substances in contact with each other is large.

As described above, both of chargeability and mold releasability can be desirably achieved by using a mold satisfying the above requirements, without providing an additional step such as a mold releasing process. Further, since the additional step such as a mold releasing step is not required, high throughput can be realized. Furthermore, the above substrate manufacturing method is particularly suitable as a method for manufacturing e.g. a substrate for PM, which requires high surface flatness and surface smoothness.

In selecting combination of a contact portion of a mold, a constructional material, and a solvent to manufacture a mold satisfying the above requirements on the contact angle and the works of adhesion, the contact angle and the works of adhesion can be measured by the following method.

Firstly, the contact angle of a solid with respect to a liquid can be measured by using a general contact angle measuring device.

The work of adhesion can be measured as follows.

Specifically, the work of adhesion Wa between a substance 1 and a substance 2 adhered to each other is expressed by the following equation (2).

$$Wa = \Gamma_{1g} + \Gamma_{2g} - \Gamma_{12} \quad (2)$$

where $\Gamma_{1g}$ denotes an interfacial free energy between the substance 1 and the air, $\Gamma_{2g}$ denotes an interfacial free energy between the substance 2 and the air, and $\Gamma_{12}$ denotes an interfacial free energy between the substance 1 and the substance 2.

Firstly, there is described a case that the work of adhesion W2 between the contact portion and the solvent is measured, in other words, the work of adhesion between a solid and a liquid is measured. In this section, description is made based on the premise that the substance 1 is a contact portion (solid), and the substance 2 is a solvent (liquid).

Figure 2:
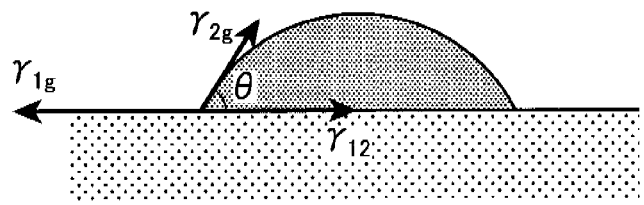
FIG. 2 is a diagram showing a state that a solvent is dropped onto a contact portion.

Specifically, if the substance 2 (solvent) is dropped onto the substance 1 (contact portion), the state as shown in FIG. 2 is obtained. In other words, a droplet of the substance 2 is formed on the substance 1 so that the contact angle of the substance 2 with respect to the substance 1 becomes equal to θ. FIG. 2 is a diagram showing a state that the solvent is dropped onto the contact portion.

The above droplet is formed as a result of balancing various interfacial tensions. The relation between forces of components in a direction in parallel to the direction of a plane where the substance 2 (solvent) is contacted with the substance 1 (contact portion) is expressed by the following equation (3).

$$\gamma_{1g} = \gamma_{12} + \gamma_{2g} \cos\theta \quad (3)$$

where $\gamma_{1g}$ denotes an interfacial tension between the substance 1 and the air, $\gamma_{2g}$ denotes an interfacial tension between the substance 2 and the air, $\gamma_{12}$ denotes an interfacial tension between the substance 1 and the substance 2, and θ denotes a contact angle of the substance 2 with respect to the substance 1. Further, since $\gamma_{2g}$ denotes an interfacial tension between a liquid and an air, which corresponds to a surface tension.

On the other hand, since an interfacial tension is an interfacial free energy per unit area, the following equation (4) is established in the similar manner as the equation (3).

$$\Gamma_{1g} = \Gamma_{12} + \Gamma_{2g} \cos\theta \quad (4)$$

Accordingly, the following equation (5) is derived from the equation (2) and the equation (4).

$$Wa = \Gamma_{2g}(1 + \cos\theta) \quad (5)$$

The surface tension $\gamma_{2g}$ of the liquid (substance 2) can be measured by e.g. a Wilhelmy method, a capillary-rise method, and a sessile drop method. The interfacial free energy $\Gamma_{2g}$ between the liquid (substance 2) and the air can be calculated based on the surface tension $\gamma_{2g}$.

Further, the contact angle θ of the solid (substance 1) with respect to the liquid (substance 2) can be calculated by e.g. using a general contact angle measuring device in the similar manner as described above.

Thus, the work of adhesion between a solid and a liquid, e.g. the work of adhesion W2 between the contact portion and the solvent can be calculated by using the equation (5), based on the interfacial free energy $\Gamma_{2g}$ between the liquid (substance 2) and the air, and the contact angle θ of the solid (substance 1) with respect to the liquid (substance 2).

Next, there is described a case where the work of adhesion W1 between the contact portion and the constructional material is measured, in other words, the work of adhesion between a solid and a solid is measured. In this section, description is made based on the premise that the substance 1 is a contact portion (solid), and the substance 2 is a constructional material (solid).

Figure 3:
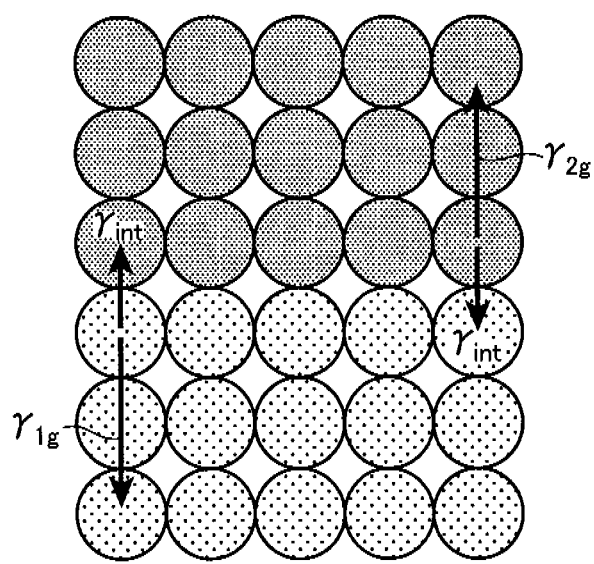
FIG. 3 is a diagram for explaining how forces act on a substance 1 and a substance 2 in the case where the substance 1 and the substance 2 are adhered to each other.

Specifically, let us observe e.g. an interface in the case where the substance 1 (contact portion) and the substance 2 (constructional material) are adhered to each other. When the substance 1 and the substance 2 are away from each other, the interfacial tension $\gamma_{1g}$ is acted on the molecules on the outermost surface of the substance 1, and the interfacial tension $\lambda_{2g}$ is acted on the molecules on the outermost surface of the substance 2. Then, when the substance 1 and the substance 2 are adhered to each other, as shown in FIG. 3, an interactive force $\gamma_{int}$ between the substance 1 and the substance 2 is acted on each of the molecules on the outermost surface of the substance 1 and on each of the molecules of the outermost surface of the substance 2, other than the interfacial tension $\gamma_{1g}$ and the interfacial tension $\lambda_{2g}$. The interactive force $\gamma_{int}$ is acted to stabilize the interface between the substance 1 and the substance 2. FIG. 3 is a diagram for describing how forces are acted, in the case where the substance 1 and the substance 2 are adhered to each other.

The interfacial tension $\gamma_{12}$ acting on the interface between the substance 1 and the substance 2 is expressed by the following equation (6).

$$\gamma_{12} = (\gamma_{1g} - \gamma_{int}) + (\gamma_{2g} - \gamma_{int}) = \gamma_{1g} + \gamma_{2g} - 2\gamma_{int} \quad (6)$$

Further, let us observe the components constituting the interfacial tension. The interfacial tension is composed of a dispersion component, a polar component, and a hydrogen bond component of a substance, and these components are conceived not to interfere with each other. Accordingly, the interfacial tension is generally expressed by the following equation (7).

$$\gamma = \gamma^d + \gamma^p + \gamma^h \quad (7)$$

where $\gamma^d$ denotes a dispersion component of the interfacial tension, $\gamma^p$ denotes a polar component of the interfacial tension, and $\gamma^h$ denotes a hydrogen bond component of the interfacial tension.

The interactive force $\gamma_{int}$ between the substance 1 and the substance 2 is an interaction of the interfacial tension between the substance 1 and the substance 2. As described above, it is conceived that the respective components i.e. the dispersion component, the polar component, and the hydrogen bond component of the interfacial tension do not interfere with each other. Accordingly, the interactive force $\gamma_{int}$ between the substance 1 and the substance 2 is expressed by the following equation (8).

$$\gamma_{int}=(\gamma_{1g}{}^d\gamma_{2g}{}^d)^{1/2}+(\gamma_{1g}{}^p\gamma_{2g}{}^p)^{1/2}+(\gamma_{1g}{}^h\gamma_{2g}{}^h)^{1/2} \quad (8)$$

where $\gamma_{1g}{}^d$ denotes a dispersion component of the interfacial tension of the substance 1, $\gamma_{2g}{}^d$ denotes a dispersion component of the interfacial tension of the substance 2, $\gamma_{1g}{}^p$ denotes a polar component of the interfacial tension of the substance 1, $\gamma_{2g}{}^p$ denotes a polar component of the interfacial tension of the substance 2, $\gamma_{1g}{}^h$ denotes a hydrogen bond component of the surface tension of the substance 1, and $\gamma_{2g}{}^h$ denotes a hydrogen bond component of the surface tension of the substance 2.

Then, the following equation (9) is derived from the equation (6) and the equation (8).

$$\gamma_{12}=\gamma_{1g}+\gamma_{2g}-2[(\gamma_{1g}{}^d\gamma_{2g}{}^d)^{1/2}+(\gamma_{1g}{}^p\gamma_{2g}{}^p)^{1/2}+(\gamma_{1g}{}^h\gamma_{2g}{}^h)^{1/2}] \quad (9)$$

On the other hand, since the interfacial tension is an interfacial free energy per unit area, the following equation (10) is established in the similar manner as the equation (9).

$$\Gamma_{12}=\Gamma_{1g}+\Gamma_{2g}-2[(\Gamma_{1g}{}^d\Gamma_{2g}{}^d)^{1/2}+(\Gamma_{1g}{}^p\Gamma_{2g}{}^p)^{1/2}+(\Gamma_{1g}{}^h\Gamma_{2g}{}^h)^{1/2}] \quad (10)$$

where $\Gamma_{1g}{}^d$ denotes a dispersion component of the interfacial free energy of the substance 1, $\Gamma_{2g}{}^d$ denotes a dispersion component of the interfacial free energy of the substance 2, $\Gamma_{1g}{}^p$ denotes a polar component of the interfacial free energy of the substance 1, $\Gamma_{2g}{}^p$ denotes a polar component of the interfacial free energy of the substance 2, $\Gamma_{1g}{}^h$ denotes a hydrogen bond component of the interfacial free energy of the substance 1, and $\Gamma_{2g}{}^h$ denotes a hydrogen bond component of the interfacial free energy of the substance 2.

Accordingly, the following equation (11) is derived from the equation (2) and the equation (10).

$$Wa=2(\Gamma_{1g}{}^d\Gamma_{2g}{}^d)^{1/2}+2(\Gamma_{1g}{}^p\Gamma_{2g}{}^p)^{1/2}+2(\Gamma_{1g}{}^h\Gamma_{2g}{}^h)^{1/2} \quad (11)$$

Accordingly, the work of adhesion Wa between the substance 1 and the substance 2 can be calculated by substituting the values obtained by measuring the respective components of the interfacial free energy of each of the substance 1 and the substance 2 with respect to the air in the equation (11).

In the foregoing, described is the case where the work of adhesion between a solid and a solid is measured. Alternatively, the equation (11) is applicable to a case where the work of adhesion between a solid and a liquid, or the work of adhesion between a liquid and a liquid is measured.

More specifically, measurement is performed as follows.

Firstly, a contact angle of a liquid with respect to the substance 1 (solid) is measured, using a liquid whose surface tension (interfacial tension) is known or already measured, and whose molecules contain only a dispersion component, and is devoid of a polar component and a hydrogen bond component.

Then, an interfacial free energy is calculated based on the surface tension of the liquid, and the work of adhesion between the substance 1 and the liquid is calculated using the equation (5), based on the calculated interfacial free energy and the measured contact angle.

On the other hand, since the interfacial free energy of the liquid is constituted only of a dispersion component, it is possible to calculate a dispersion component of the interfacial free energy of the substance 1 using the equation (11), based on the calculated work of adhesion between the substance 1 and the liquid.

Next, a contact angle of the liquid with respect to the substance 1 (solid) is measured, using a liquid whose surface tension is known or already measured, and whose molecules contain only a polar component or contain a polar component and a dispersion component, and is devoid of a hydrogen bond component.

Then, an interfacial free energy is calculated based on the surface tension of the liquid, and the work of adhesion between the substance 1 and the liquid is calculated using the equation (5), based on the calculated interfacial free energy and the measured contact angle.

On the other hand, since the interfacial free energy of the liquid is composed only of a polar component or composed of a polar component and a dispersion component, and the dispersion component of the interfacial free energy of the substance 1 has already been calculated by the above method, it is possible to calculate a polar component of the interfacial free energy of the substance 1, using the equation (11), based on the calculated work of adhesion between the substance 1 and the liquid.

Then, a contact angle of the liquid with respect to the substance 1 (solid) is measured, using a liquid whose surface tension is known or already measured, and whose molecules contain a hydrogen bond component.

Then, an interfacial free energy is calculated based on the surface tension of the liquid, and the work of adhesion between the substance 1 and the liquid is calculated using the equation (5), based on the calculated interfacial free energy and the measured contact angle.

On the other hand, since the interfacial free energy of the liquid contains a hydrogen bond component, and the dispersion component and the polar component of the interfacial free energy of the substance 1 have already been calculated by the above method, it is possible to calculate a polar component of the interfacial free energy of the substance 1 using the equation (11), based on the calculated work of adhesion between the substance 1 and the liquid.

Alternatively, it is possible to calculate the respective components of the interfacial free energy of the substance 2 in the similar manner as described above by substituting the substance 1 for the substance 2.

Lastly, it is possible to calculate the work of adhesion Wa between the substance 1 and the substance 2 using the equation (11), based on the respective components of the interfacial free energy between the substance 1 and the substance 2 which have been obtained by the above method.

Further, since the dispersion component, the polar component, and the hydrogen bond component of a surface tension are determined by the van der Waal's force, the polarity, and the hydrogen bonding strength of molecules, if the molecular structure is known, it is possible to determine which component the molecules have. For instance, in the case where polyolefin resin is used as a contact portion of a mold, glyme (symmetric glycol diether) is used as a solvent, and hydrogen silsesquioxane (HSQ) is used as a constructional material, the surface tension of polyolefin resin is mainly composed of a dispersion component. Although glyme has a polar component, the glyme is mainly composed of a dispersion component. Therefore, it is obvious that the work of adhesion Wa with respect to glyme is increased based on the equation (11), and the contact angle with respect to glyme is decreased based on the equation (5). On the other hand, HSQ contains a large amount of hydrogen bond component. Therefore, it is obvious that the work of adhesion between HSQ, and polyolefin resin which mainly contains a dispersion component is decreased based on the equation (11).

Combination of a contact portion of a mold, a constructional material, and a solvent is not specifically limited, as far as the contact angle and the works of adhesion obtained by the above method satisfy the above requirements. For instance, it is preferable to use a combination, wherein the contact portion is made of a resin, the solvent is an organic solvent, and the constructional material is a silicon compound.

Examples of the resin are polyolefin resin, polystyrene resin, polycarbonate resin, acrylic resin, and cellulosic resin. Examples of the polyolefin resin are cycloolefin resin and polymethylpentene resin. Examples of the cellulosic resin is triacetylcellulose (TAC).

Examples of the organic solvent are ketones, ethers, alcohols, and esters. Examples of the ketones are acetone and methylisobutylketone. Examples of the ethers are glymes such as propylene glycol dimethyl ether and ethylene glycol dimethyl ether. Examples of the alcohols are glycol, methanol, ethanol, isopropyl alcohol, and butanol.

Examples of the silicon compound are silicate and siloxane. Examples of the siloxane are silsesquioxane such as hydrogen silsesquioxane (HSQ).

Further, it is preferable to use a combination, wherein the contact portion is made of a material of at least one kind selected from the group consisting of acrylic resin, cellulosic resin, polycarbonate resin, polyolefin resin, and polystyrene resin; the solvent is at least one kind selected from the group consisting of ketones and ethers, and the constructional material is a silicon compound. Use of the above combination enables to satisfy both of the requirements on chargeability and mold releasability. Further, it is possible to use e.g. a material called spin-on glass (SOG), as a solution obtained by dissolving a constructional material in a solvent.

Further, combination of a contact portion of a mold, a constructional material, and a solvent is determined as far as the contact angle and the work of adhesion satisfy the above requirements. Accordingly, for instance, the contact portion may be made quartz, the solvent may be water, and the constructional material may be oligomer of a resin e.g. oligomer of cellulosic resin or oligomer of glucose resin.

In the following, a method for manufacturing a substrate according to the embodiment is described.

Firstly, the mold is prepared. The mold may include a contact portion satisfying the above requirements on the contact angle and the works of adhesion, at a position to be contacted with the solution. For instance, the contact portion may be formed over the entirety of the mold, or the contact portion may be disposed on a base member made of silicon, quartz, or a like material. Fine concave and convex configurations are formed on a surface of the contact portion. A method for forming the fine concave and convex configurations is not specifically limited, and a well-known fine processing technique or transfer technique may be used to form the fine concave and convex configurations.

A solution obtained by dissolving a constructional material in a solvent is prepared as an imprint material. As far as combination of the constructional material and the solvent can satisfy the requirements on the contact angle and the works of adhesion, and the constructional material can be dissolved in the solvent, the constructional material and the solvent are not specifically limited. Further alternatively, the solvent may be one kind which satisfies the above requirements, or combination of solvents of two or more kinds may be used in the aspect of adjusting e.g. the viscosity and the drying speed of the solution, and the dissolvability of the constructional material. Further alternatively, it is possible to use one kind of the constructional material which satisfies the above requirements, or use combination of constructional materials of two or more kinds in the aspect of adjusting the viscosity of the solution, the dissolvability of the constructional material, and the hardness of the imprint material after drying and solidification.

Next, a solution, which is an imprint material before drying, is applied between the mold and a substrate base member. The applying method is not specifically limited, and, for instance, the following method may be performed.

Firstly, the solution is coated on a surface of at least one of the mold and the substrate base member. The solution may be coated on a surface of one of the mold and the substrate base member, but it is preferable to coat the solution on the mold in order to enhance chargeability of the solution. Further, the coating method is not specifically limited, and a well-known coating method may be used. For instance, coating by a dispenser or a like device may be performed, or the solution may be coated and spread by using a spin-coat process, a wire bar applicator, or a like process. Further, the substrate base member is a member capable of forming a substrate e.g. a substrate for PM by forming a surface portion composed of a constructional material having fine concave and convex configurations on a surface thereof. The substrate base member is not specifically limited, and e.g. a quartz substrate may be used.

Then, the mold and the substrate base member are placed one over the other so that the solution is applied between the mold and the substrate base member. Since the mold satisfies the above requirements on the contact angle and the works of adhesion, the imprint material is properly charged into the fine concave and convex configurations of the mold. Further, it is preferable to rotate the mold and the substrate base member after the mold and the substrate base member are placed one over the other, or apply a load to the mold and the substrate base member. This enables to make the thickness of a film composed of the solution uniform, and remove an excessive solution.

Next, the solvent is dried in a state that the solution is applied between the mold and the substrate base member. Thereby, the imprint material is solidified, and a surface portion carrying a transferred configuration corresponding to the fine concave and convex configurations of the mold is formed. In the drying process, the solvent may not be required to be completely removed, as far as the transferred concave and convex configurations can be secured. Further, the drying method is not specifically limited, and a well-known drying method may be used. For instance, the solution may be left in a room temperature condition. However, it is preferable to perform e.g. a vacuum process, an air blowing process, or a heating process in the aspect of enhancing the drying process. In the case where the heating process is performed, it is preferable not to raise the heating temperature over the boiling point of the solvent. This enables to suppress transfer failure of concave and convex configurations, because there is no or less likelihood that the solution may be boiled, and air bubbles may remain in the imprint material.

Then, the mold is released from the surface portion. Since the mold satisfies the above requirements on the contact angle and the works of adhesion, it is possible to secure desirable mold releasability. Further, the mold releasing method is not specifically limited, and for instance, the following method may be used. The mold may be released from the substrate by uniformly applying a tension force to both of the mold, and the substrate having the surface portion. Further alternatively, a mark for guiding mold releasing such as a cutaway may be formed on the interface between the mold and the substrate, and the mold may be released, using the mark for guiding mold releasing as a start point. Further alternatively, in the case where the substrate or the mold is a flexible member such as a film, it is preferable to release the mold by peeling, because a less mold releasing force is required at the time of releasing, and mold releasing is easy. Further alternatively, the mold may be released by wet etching or dry etching, using a solution, a gas, or a like material having a high selectivity ratio between the mold material, and the materials other than the mold material. Further alternatively, the mold may be released by melting the mold by heating the mold to such a temperature as not to melt the materials other than the mold material, in the case where the melting point of the mold material is lower than the melting points of the materials other than the mold material.

With the above manufacturing method, it is possible to easily manufacture a substrate provided with a surface portion having fine concave and convex configurations, without damaging the concave and convex configurations. Accordingly, the substrate manufactured by the substrate manufacturing method can be properly used as e.g. a substrate for PM having fine concave and convex configurations.

Further, PM can be formed by forming a magnetic layer on a surface of the substrate. Specifically, it is possible to obtain PM provided with the substrate, and a magnetic layer formed on the substrate, wherein the concave and convex configurations on the surface portion of the substrate are such that convexes or concaves are orderly arranged. An example of the PM is PM provided with the substrate, and a magnetic layer formed on the substrate, wherein a magnetic layer portion formed on the convexes of the surface portion of the substrate, and a magnetic layer portion formed on the concaves of the surface portion of the substrate are separated from each other. Finely forming the concave and convex configurations of the substrate enables to obtain PM having a high recording density. The construction of the magnetic layer, and the method for forming the magnetic layer are not specifically limited, and a well-known magnetic layer and a well-known magnetic layer forming method may be used. Further alternatively, a foundation layer may be formed between the substrate and the magnetic layer.

EXAMPLES

In the following, the invention is concretely described by the examples. However, the invention is not limited to the examples.

Example 1

A substrate was manufactured as shown in FIGS. 4A through 4D.

Figure 4A:
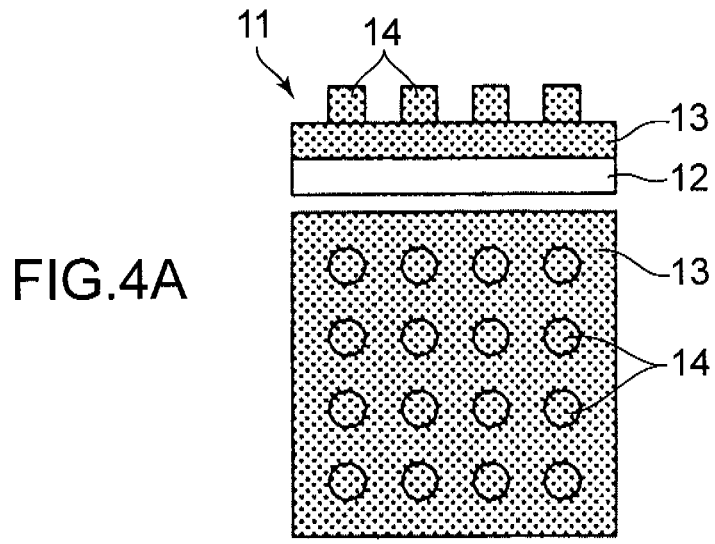
FIGS. 4A through 4D are diagrams showing a substrate manufacturing method as Example 1.

Firstly, a mold 11 as shown in FIG. 4A was prepared. Specifically, PAK-02 (produced by Toyo Gosei Kogyo Co., Ltd.) was coated on a silicon substrate 12 of 30 mm×30 mm. Then, there was fabricated the mold 11 having, on the silicon substrate 12, a contact portion 13 with multitudes of cylindrical-column shaped convexes 14 of 360 nm in pitch, 200 nm in height, and 180 nm in diameter in a square-lattice pattern by an optical imprint method, as shown in FIG. 4A. The contact portion 13 was made of acrylic resin.

Figure 4B:
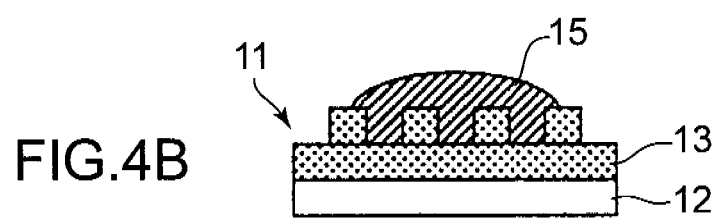

Then, a spin-on glass (SOG) under the tradename of OCD T-12 900-V (produced by Tokyo Ohka Kogyo Co., Ltd.) was prepared as an imprint material (solution). Then, as shown in FIG. 4B, 40 µl of the solution 15 was coated on the contact portion 13 of the mold 11 by a dispenser. The SOG is a solution containing propylene glycol dimethyl ether as a solvent, and ladder-type hydrogen silsesquioxane as a solute (constructional material).

The contact angle of acrylic resin with respect to propylene glycol dimethyl ether was about 20°, which was smaller than 90°.

The surface tension of acrylic resin is mainly composed of a dispersion component. Although propylene glycol dimethyl ether has a polar component, the main component thereof is a dispersion component. Accordingly, it is conceived that the work of adhesion between acrylic resin and propylene glycol dimethyl ether is large, based on the equation (11). On the other hand, ladder-type hydrogen silsesquioxane contains a large amount of hydrogen bond component. Accordingly, it is conceived that the work of adhesion between acrylic resin whose primary component is a dispersion component, and ladder-type hydrogen silsesquioxane is small, based on the equation (11). Thus, it is conceived that the work of adhesion between acrylic resin and ladder-type hydrogen silsesquioxane is smaller than the work of adhesion between acrylic resin and propylene glycol dimethyl ether.

Actually, the work of adhesion between acrylic resin and propylene glycol dimethyl ether was 73.2 mN/m, and the work of adhesion between ladder-type hydrogen silsesquioxane and acrylic resin was 39.2 mN/m. A work of adhesion in this experiment is a work of adhesion per unit area. Accordingly, the work of adhesion between acrylic resin and ladder-type hydrogen silsesquioxane was smaller than the work of adhesion between acrylic resin and propylene glycol dimethyl ether.

Figure 4C:
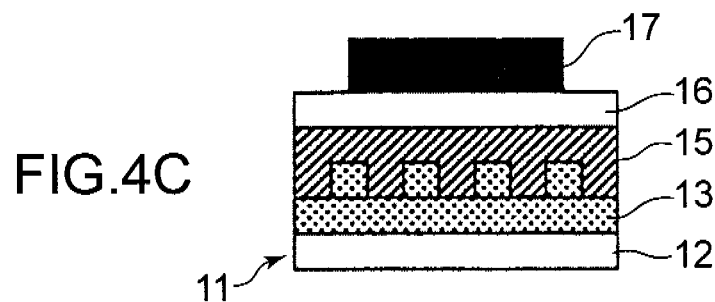

Then, as shown in FIG. 4C, a quartz substrate 16 of 30 mm×30 mm was placed, with the solution 15 being applied between the quartz substrate 16 and the mold 11. Then, a load 17 of 50 g was applied to the quartz substrate 16 to dry the solvent for 30 minutes. Thus, the solvent was removed from the solution, and a surface portion 18 composed of a constructional material was formed.

Figure 4D:
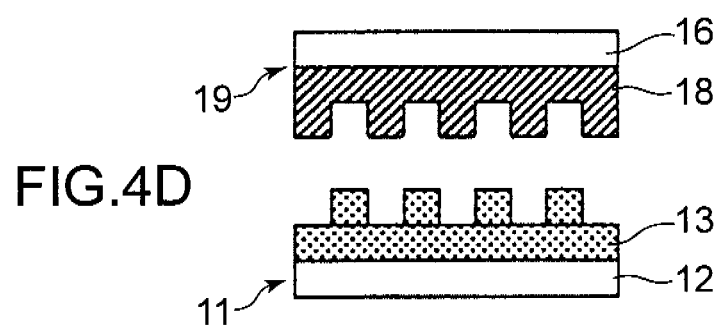

Lastly, the mold 11 was released. Specifically, as shown in FIG. 4D, the mold 11 was released from a substrate 19 having the surface portion 18. Thus, the substrate 19 having the surface portion 18 with concave and convex configurations corresponding to the concaves and convexes of the mold 11 was obtained. No defect was found on the concaves and convexes of the surface portion 18, and no residue of the imprint material was found on the mold 11. The method for checking a defect was performed as follows. The entire surface of the surface portion 18 was observed visually and by an optical microscope (magnification: 50 times). After no conspicuous defect was found, the surface portion 18 was checked by measuring three portions each having an area of 2 µm×2 µm by an atomic force microscope (AFM).

Example 2

A substrate was manufactured as shown in FIGS. 5A through 5D.

Figure 5A:
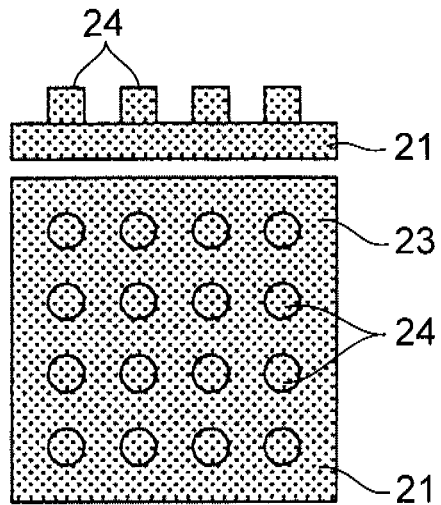
FIGS. 5A through 5D are diagrams showing a substrate manufacturing method as Example 2.

Firstly, a mold 21 as shown in FIG. 5A was prepared. Specifically, there was fabricated the mold 21 having multitudes of cylindrical-column shaped convexes 24 of 360 nm in pitch, 200 nm in height, and 180 nm in diameter in a square-lattice pattern using a film of triacetylcellulose (TAC) by a cast method, as shown in FIG. 5A. The mold 21 was made of TAC, and a contact portion was also made of TAC.

Figure 5B:
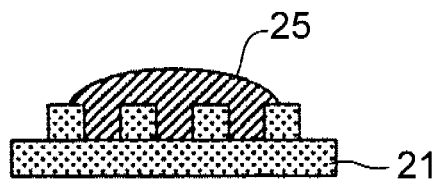

Then, similarly to Example 1, a spin-on glass (SOG) under the tradename of OCD T-12 900-V (produced by Tokyo Ohka Kogyo Co., Ltd.) was prepared as an imprint material (solution). Then, as shown in FIG. 5B, 40 μl of the solution 25 was coated on the mold 21 by a dispenser. The SOG is a solution containing propylene glycol dimethyl ether as a solvent, and ladder-type hydrogen silsesquioxane as a solute (constructional material).

The contact angle of TAC with respect to propylene glycol dimethyl ether was about 20°, which was smaller than 90°.

The surface tension of TAC is mainly composed of a dispersion component. Although propylene glycol dimethyl ether has a polar component, the main component thereof is a dispersion component. Accordingly, it is conceived that the work of adhesion between TAC and propylene glycol dimethyl ether is large, based on the equation (11). On the other hand, ladder-type hydrogen silsesquioxane contains a large amount of hydrogen bond component. Accordingly, it is conceived that the work of adhesion between TAC whose primary component is a dispersion component, and ladder-type hydrogen silsesquioxane is small, based on the equation (11). Thus, it is conceived that the work of adhesion between TAC and ladder-type hydrogen silsesquioxane is smaller than the work of adhesion between TAC and propylene glycol dimethyl ether.

Actually, the work of adhesion between TAC and propylene glycol dimethyl ether was 100.4 mN/m, and the work of adhesion between ladder-type hydrogen silsesquioxane and TAC was 98.7 mN/m. Accordingly, the work of adhesion between TAC and ladder-type hydrogen silsesquioxane was smaller than the work of adhesion between TAC and propylene glycol dimethyl ether.

Figure 5C:
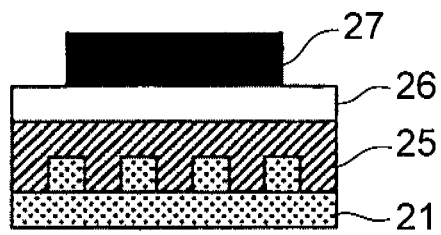

Then, as shown in FIG. 5C, a quartz substrate 26 of 30 mm×30 mm was placed, with the solution 25 being applied between the quartz substrate 26 and the mold 21. Then, a load 27 of 50 g was applied to the quartz substrate 26 to dry the solvent for 30 minutes. Thus, the solvent was removed from the solution, and a surface portion 28 composed of a constructional material was formed.

Figure 5D:
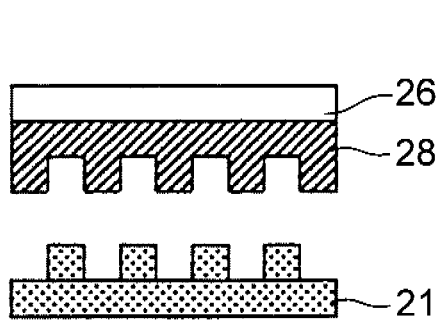

Lastly, the mold 21 was released. Specifically, as shown in FIG. 5D, the mold 21 was released from a substrate 29 having the surface portion 28. Thus, the substrate 29 having the surface portion 28 with concave and convex configurations corresponding to the concaves and convexes of the mold 21 was obtained. No defect was found on the concaves and convexes of the surface portion 28, and no residue of the imprint material was found on the mold 21. The method for checking a defect was the same as used in Example 1.

Example 3

A substrate was manufactured as shown in FIGS. 6A through 6D.

Figure 6A:
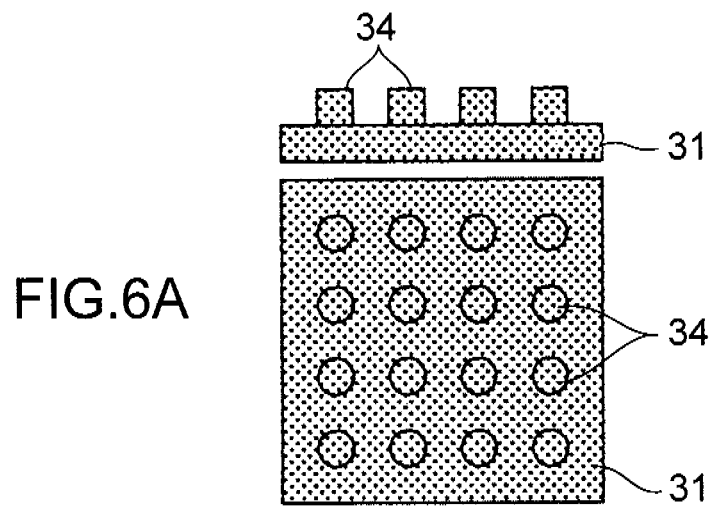
FIGS. 6A through 6D are diagrams showing a substrate manufacturing method as Example 3.

Firstly, a mold 31 as shown in FIG. 6A was prepared. Specifically, there was fabricated the mold 31 having multitudes of cylindrical-column shaped convexes 34 of 360 nm in pitch, 200 nm in height, and 180 nm in diameter in a square-lattice pattern using a film of polycarbonate (PC) by a cast method, as shown in FIG. 6A. The mold 31 was made of PC, and a contact portion was also made of PC.

Figure 6B:

Then, similarly to Example 1, a spin-on glass (SOG) under the tradename of OCD T-12 900-V (produced by Tokyo Ohka Kogyo Co., Ltd.) was prepared as an imprint material (solution). Then, as shown in FIG. 6B, 10 μl of the solution 35 was coated on a quartz substrate 36 of 30 mm×30 mm by a dispenser. The SOG is a solution containing propylene glycol dimethyl ether as a solvent, and ladder-type hydrogen silsesquioxane as a solute (constructional material).

The contact angle of PC with respect to propylene glycol dimethyl ether was about 20°, which was smaller than 90°.

The surface tension of PC is mainly composed of a dispersion component. Although propylene glycol dimethyl ether has a polar component, the main component thereof is a dispersion component. Accordingly, it is conceived that the work of adhesion between PC and propylene glycol dimethyl ether is large, based on the equation (11). On the other hand, ladder-type hydrogen silsesquioxane contains a large amount of hydrogen bond component. Accordingly, it is conceived that the work of adhesion between PC whose primary component is a dispersion component, and ladder-type hydrogen silsesquioxane is small, based on the equation (11). Thus, it is conceived that the work of adhesion between PC and ladder-type hydrogen silsesquioxane is smaller than the work of adhesion between PC and propylene glycol dimethyl ether.

Actually, the work of adhesion between PC and propylene glycol dimethyl ether was 86.9 mN/m, and the work of adhesion between ladder-type hydrogen silsesquioxane and PC was 27.3 mN/m. Accordingly, the work of adhesion between PC and ladder-type hydrogen silsesquioxane was smaller than the work of adhesion between PC and propylene glycol dimethyl ether.

Figure 6C:
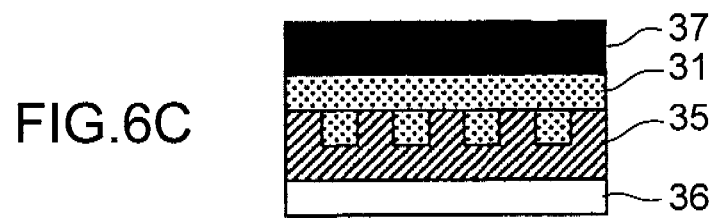

Then, as shown in FIG. 6C, the mold 31 placed, with the solution 35 being applied between the quartz substrate 36 and the mold 31. Then, a load 37 of 50 g was applied to the mold 31 to dry the solvent for 5 minutes. Thus, the solvent was removed from the solution, and a surface portion 38 composed of a constructional material was formed.

Figure 6D:
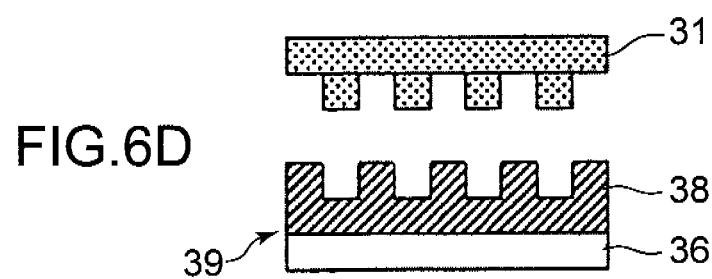

Lastly, the mold 31 was released. Specifically, as shown in FIG. 6D, the mold 31 was released from a substrate 39 having the surface portion 38. Thus, the substrate 39 having the surface portion 38 with concave and convex configurations corresponding to the concaves and convexes of the mold 31 was obtained. No defect was found on the concaves and convexes of the surface portion 38, and no residue of the imprint material was found on the mold 31. The method for checking a defect was the same as used in Example 1.

Example 4

A substrate was manufactured as shown in FIGS. 7A through 7D.

Figure 7A:
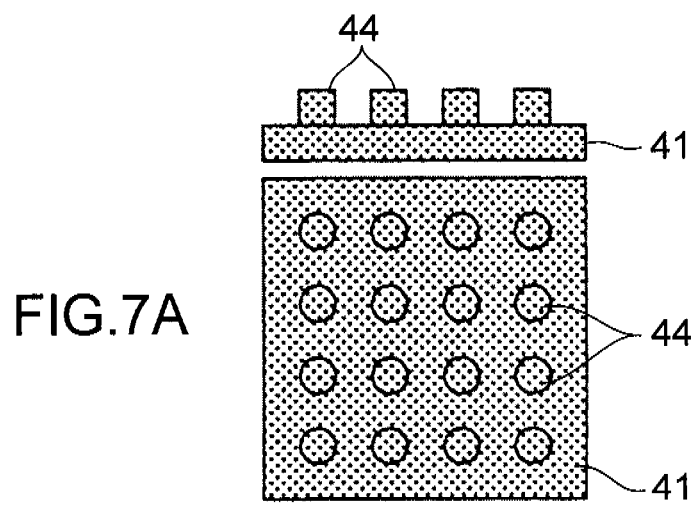
FIGS. 7A through 7D are diagrams showing a substrate manufacturing method as Example 4.

Firstly, a mold 41 as shown in FIG. 7A was prepared. Specifically, there was fabricated the mold 41 having multitudes of cylindrical-column shaped convexes 44 of 360 nm in pitch, 200 nm in height, and 180 nm in diameter in a square-lattice pattern using a film of polymethylpentene (PMP) by a cast method, as shown in FIG. 7A. The mold 41 was made of PMP, and a contact portion was also made of PMP.

Figure 7B:

Then, a spin-on glass (SOG) under the tradename of FOx-16 (produced by Dow Corning Toray Co., Ltd.) was prepared as an imprint material (solution). Then, as shown in FIG. 7B, 40 μl of the solution 45 was coated on a quartz substrate 46 of 30 mm×30 mm by a dispenser. The SOG is a solution containing methylisobutylketone as a solvent, and cage-type hydrogen silsesquioxane as a solute (constructional material).

The contact angle of PMP with respect to methylisobutylketone was about 20°, which was smaller than 90°.

The surface tension of PMP is mainly composed of a dispersion component. Although methylisobutylketone has a polar component, the main component thereof is a dispersion component. Accordingly, it is conceived that the work of adhesion between PMP and methylisobutylketone is large, based on the equation (11). On the other hand, cage-type hydrogen silsesquioxane contains a large amount of hydrogen bond component. Accordingly, it is conceived that the work of adhesion between PMP whose primary component is a dispersion component, and cage-type hydrogen silsesquioxane is small, based on the equation (11). Thus, it is conceived that the work of adhesion between PMP and cage-type hydrogen silsesquioxane is smaller than the work of adhesion between PMP and methylisobutylketone.

Actually, the work of adhesion between PMP and methylisobutylketone was 99.5 mN/m, and the work of adhesion between cage-type hydrogen silsesquioxane and PMP was 18.9 mN/m. Accordingly, the work of adhesion between PMP and cage-type hydrogen silsesquioxane was smaller than the work of adhesion between PMP and methylisobutylketone.

Figure 7C:
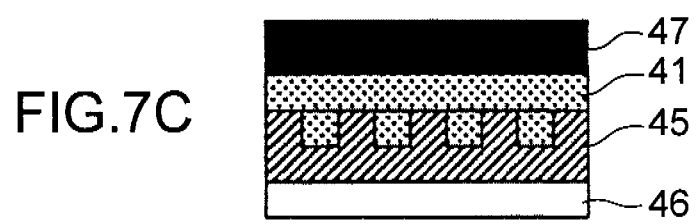

Then, as shown in FIG. 7C, the mold 41 was placed, with the solution 45 being applied between a quartz substrate 46 and the mold 41. Then, a load 47 of 50 g was applied to the mold 41 to dry the solvent for 30 minutes. Thus, the solvent was removed from the solution, and a surface portion 48 composed of a constructional material was formed.

Figure 7D:
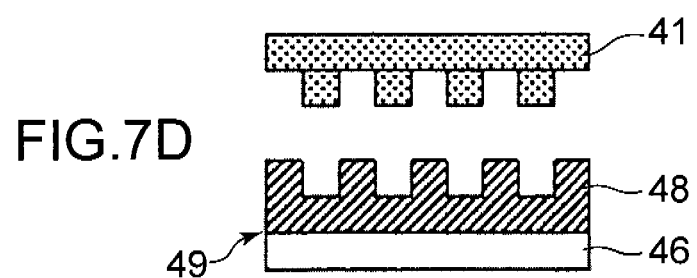

Lastly, the mold 41 was released. Specifically, as shown in FIG. 7D, the mold 41 was released from a substrate 49 having the surface portion 48. Thus, the substrate 49 having the surface portion 48 with concave and convex configurations corresponding to the concaves and convexes of the mold 41 was obtained. No defect was found on the concaves and convexes of the surface portion 48, and no residue of the imprint material was found on the mold 41. The method for checking a defect was the same as used in Example 1.

Example 5

A substrate was manufactured as shown in FIGS. 8A through 8D.

Figure 8A:
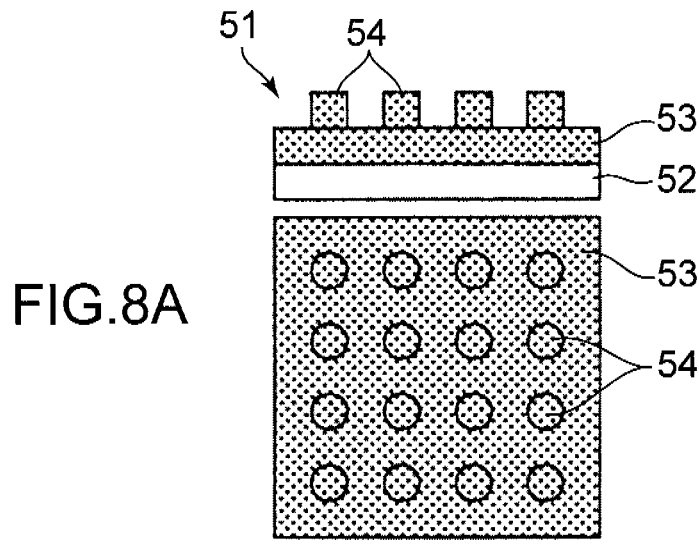
FIGS. 8A through 8D are diagrams showing a substrate manufacturing method as Example 5.

Firstly, a mold 51 as shown in FIG. 8A was prepared. Specifically, ZEP520A (produced by Japan Zeon Co., Ltd.) was coated on a silicon substrate 52 of 30 mm×30 mm. Then, there was fabricated the mold 51 having, on the silicon substrate 52, a contact portion 53 with multitudes of cylindrical-column shaped convexes 54 of 360 nm in pitch, 200 nm in height, and 180 nm in diameter in a square-lattice pattern by a thermal imprint method, as shown in FIG. 8A. The contact portion 53 was made of polystyrene (PS) copolymer.

Figure 8B:
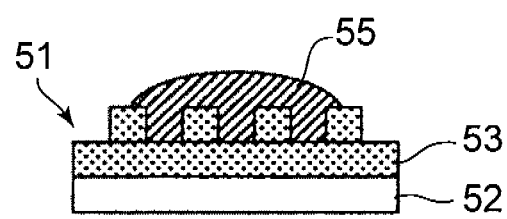

Then, similarly to Example 4, a spin-on glass (SOG) under the tradename of FOx-16 (produced by Dow Corning Toray Co., Ltd.) was prepared as an imprint material (solution). Then, as shown in FIG. 8B, 40 μl of the solution 55 was coated on the contact portion 53 of the mold 51 by a dispenser. The SOG is a solution containing methylisobutylketone as a solvent, and cage-type hydrogen silsesquioxane as a solute (constructional material).

The contact angle of PS copolymer with respect to methylisobutylketone was about 30°, which was smaller than 90°.

The surface tension of PS copolymer is mainly composed of a dispersion component. Although methylisobutylketone has a polar component, the main component thereof is a dispersion component. Accordingly, it is conceived that the work of adhesion between PS copolymer and methylisobutylketone is large, based on the equation (11). On the other hand, cage-type hydrogen silsesquioxane contains a large amount of hydrogen bond component. Accordingly, it is conceived that the work of adhesion between PS copolymer whose primary component is a dispersion component, and cage-type hydrogen silsesquioxane is small, based on the equation (11). Thus, it is conceived that the work of adhesion between PS copolymer and cage-type hydrogen silsesquioxane is smaller than the work of adhesion between PS copolymer and methylisobutylketone.

Actually, the work of adhesion between PS copolymer and methylisobutylketone was 141.2 mN/m, and the work of adhesion between cage-type hydrogen silsesquioxane and PS copolymer was 47.9 mN/m. Accordingly, the work of adhesion between PS copolymer and cage-type hydrogen silsesquioxane was smaller than the work of adhesion between PS copolymer and methylisobutylketone.

Figure 8C:
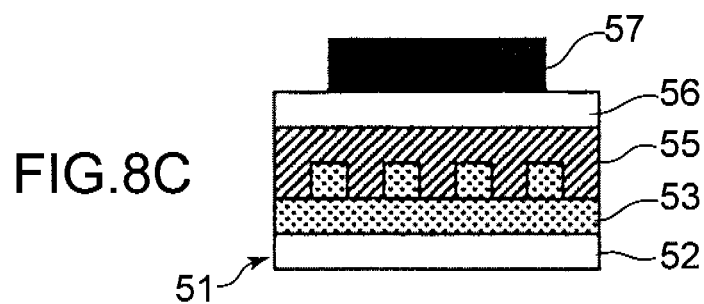

Then, as shown in FIG. 8C, a quartz substrate 56 of 30 mm×30 mm was placed, with the solution 55 being applied between the quartz substrate 56 and the mold 51. Then, a load 57 of 50 g was applied to the quartz substrate 56 to dry the solvent for 30 minutes. Thus, the solvent was removed from the solution, and a surface portion 58 composed of a constructional material was formed.

Figure 8D:
Figure 8D:
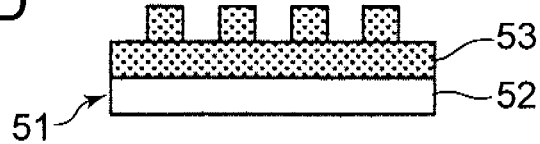

Lastly, the mold 51 was released. Specifically, as shown in FIG. 8D, the mold 51 was released from a substrate 59 having the surface portion 58. Thus, the substrate 59 having the surface portion 58 with concave and convex configurations corresponding to the concaves and convexes of the mold 51 was obtained. No defect was found on the concaves and convexes of the surface portion 58, and no residue of the imprint material was found on the mold 51. The method for checking a defect was the same as used in Example 1.

Example 6

Example 6 is substantially the same as Example 1 except that a mold having a contact portion made of quartz was used, and a solution containing water as a solvent and cellulose oligomer as a constructional material (solute) was used as an imprint material.

Firstly, a mold obtained by the following process was used. Firstly, a film made of quartz was formed on a silicon substrate 12 of 30 mm×30 mm. Then, there was fabricated a mold 11 having, on the silicon substrate 12, the contact portion 13 with multitudes of cylindrical-column shaped convexes 14 of 360 nm in pitch, 200 nm in height, and 180 nm in diameter in a square-lattice pattern by a photolithography method and a dry-etching method, as shown in FIG. 4A. The contact portion 13 was made of quartz, and a solution obtained by dissolving cellulose oligomer in water was used as an imprint material.

The contact angle of quartz with respect to water was about 20°, which was smaller than 90°.

The surface tension of quartz is mainly composed of a hydrogen bond component. Although the surface tension of water has a polar component, the surface tension of water also has a dispersion component and a hydrogen bond component. Accordingly, it is conceived that the work of adhesion between quartz and water is large, based on the equation (11). On the other hand, cellulose oligomer is mainly composed of a dispersion component. Accordingly, it is conceived that the work of adhesion between quartz which contains a large amount of hydrogen bond component, and cellulose oligomer is smaller than the work of adhesion between quartz and water, based on the equation (11).

Actually, the work of adhesion between quartz and water was 224.1 mN/m, and the work of adhesion between cellulose oligomer and quartz was 124.7 mN/m. Accordingly, the work of adhesion between quartz and cellulose oligomer was smaller than the work of adhesion between quartz and water.

A substrate 19 having a surface portion 18 with concave and convex configurations corresponding to the concaves and convexes of the mold 11 was obtained by fabricating the substrate under the above condition. No defect was found on the concaves and convexes of the surface portion 18, and no residue of the imprint material was found on the mold 11. The method for checking a defect was the same as used in Example 1.

Example 7

Example 7 is substantially the same as Example 1 except that a mold having a contact portion made of quartz was used, and a solution containing water as a solvent and glucose oligomer as a constructional material (solute) was used as an imprint material.

A mold substantially the same as Example 6 was used. A solution obtained by dissolving glucose oligomer in water was used as an imprint material.

The contact angle of quartz with respect to water was about 20°, which was smaller than 90°. The surface tension of quartz is mainly composed of a hydrogen bond component. Although the surface tension of water has a polar component, the surface tension of water also has a dispersion component and a hydrogen bond component. Accordingly, it is conceived that the work of adhesion between quartz and water is large, based on the equation (11). On the other hand, glucose oligomer is mainly composed of a dispersion component. Accordingly, it is conceived that the work of adhesion between quartz which contains a large amount of hydrogen bond component, and glucose oligomer is smaller than the work of adhesion between quartz and water, based on the equation (11).

Actually, the work of adhesion between quartz and water was 224.1 mN/m, and the work of adhesion between glucose oligomer and quartz was 135.5 mN/m. Accordingly, the work of adhesion between quartz and glucose oligomer was smaller than the work of adhesion between quartz and water.

A substrate 19 having a surface portion 18 with concave and convex configurations corresponding to the concaves and convexes of the mold 11 was obtained by fabricating the substrate under the above condition. No defect was found on the concaves and convexes of the surface portion 18, and no residue of the imprint material was found on the mold 11. The method for checking a defect was the same as used in Example 1.

Comparative Example 1

A substrate was manufactured as shown in FIGS. 9A through 9D.

Figure 9A:
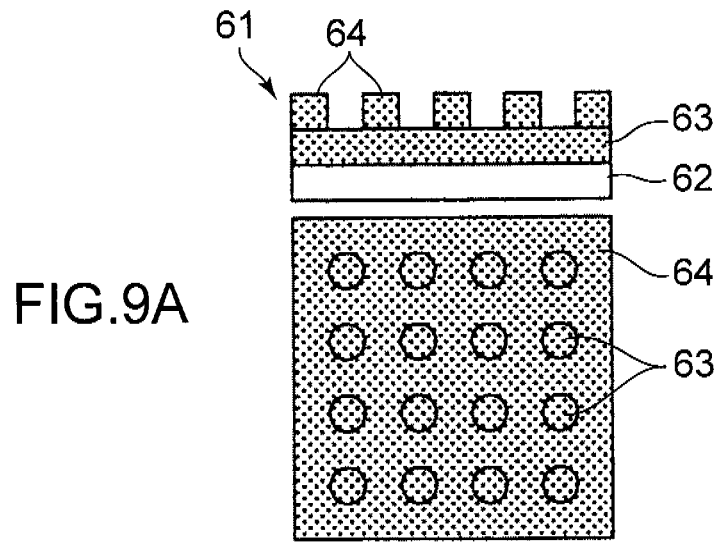
FIGS. 9A through 9D are diagrams showing a substrate manufacturing method as Comparative Example 1.
Figure 9B:
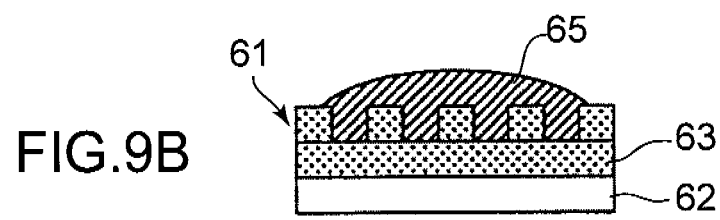
Figure 9C:
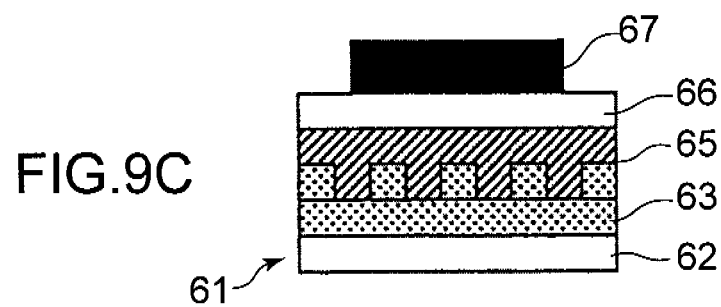

Firstly, a mold 61 as shown in FIG. 9A was prepared. Specifically, the mold 61 was the same as used in Example 6. Accordingly, a contact portion 63 was made of quartz.

Figure 9D:
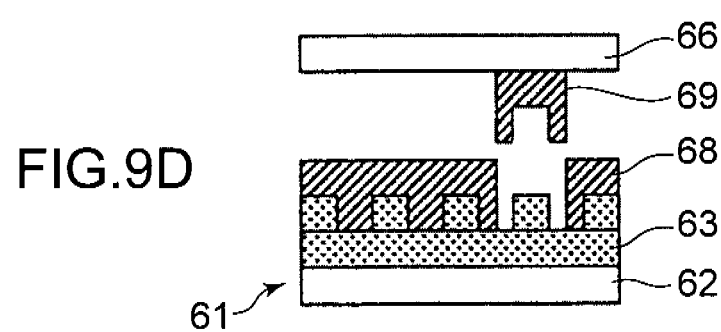

A substrate was fabricated by the same method as used in Example 1. As a result of fabrication, as shown in FIG. 9D, about 90 percentages of the imprint material after drying remained on the mold 61 at the time of mold releasing, and it was impossible to manufacture a substrate having concave and convex configurations. The method for checking a defect was the same as used in Example 1.

The contact angle of quartz with respect to propylene glycol dimethyl ether was about 30°.

The surface tension of quartz is mainly composed of a hydrogen bond component. Although propylene glycol dimethyl ether has a polar component, propylene glycol dimethyl ether mainly has a dispersion component. Accordingly, it is conceived that the work of adhesion between quartz and propylene glycol dimethyl ether is small, based on the equation (11). On the other hand, ladder-type hydrogen silsesquioxane has a large amount of hydrogen bond component. Accordingly, it is conceived that the work of adhesion between quartz having a hydrogen bond component, and ladder-type hydrogen silsesquioxane is large, based on the equation (11). Thus, it is conceived that the work of adhesion between quartz and ladder-type hydrogen silsesquioxane is larger than the work of adhesion between quartz and propylene glycol dimethyl ether.

Actually, the work of adhesion between quartz and propylene glycol dimethyl ether was 121.6 mN/m, and the work of adhesion between ladder-type hydrogen silsesquioxane and quartz was 418.7 mN/m. Accordingly, the work of adhesion between quartz and ladder-type hydrogen silsesquioxane was larger than the work of adhesion between quartz and propylene glycol dimethyl ether.

Comparative Example 2

A substrate as shown in FIGS. 10A through 10E was fabricated.

Figure 10A:
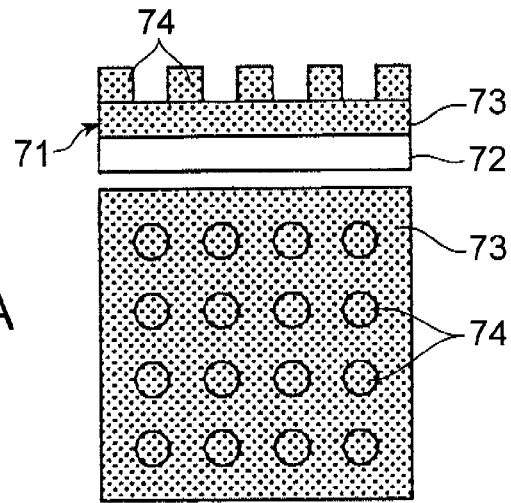
FIGS. 10A through 10E are diagrams showing a substrate manufacturing method as Comparative Example 2.
Figure 10B:
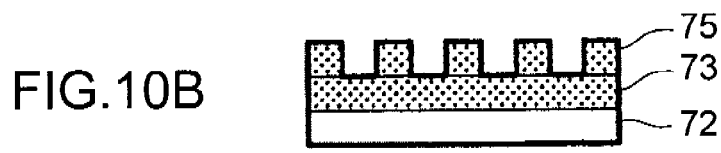

Firstly, a mold 71 as shown in FIG. 10A was prepared. Specifically, the mold 71 was the same as used in Example 6. Then, a mold releasing process was performed by coating a fluorine-based parting agent under the tradename of Optool DSX (produced by Daikin Kogyo Co., Ltd.) on the mold 71 by a dip-coating method. As a result of the mold releasing process, a coating layer 75 was formed on the mold 71, as shown in FIG. 10B.

Figure 10C:
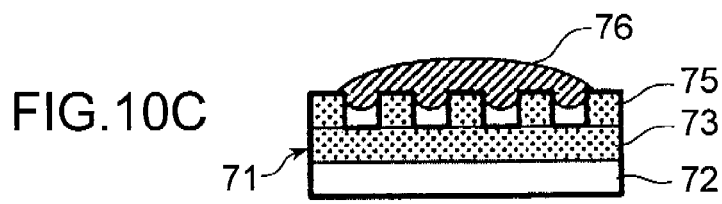

A substrate was fabricated by the same method as used in Example 1. Specifically, as shown in FIG. 10C, 40 µl of the solution 76 was coated on a contact portion 73 of the mold 71 by a dispenser. As a result of the coating, as shown in FIG. 10C, the solution 76 was repelled on the coating layer 75, and it was impossible to secure chargeability of the solution 76. The contact angle of the coating layer 75 with respect to propylene glycol dimethyl ether (solvent of the solution 76) was about 100°. Coating a fluorine-based parting agent on the mold to form a coating layer made the contact angle of 90° or larger. The relation between the works of adhesion with respect to the coating layer is as described below.

Actually, the work of adhesion between the coating layer and propylene glycol dimethyl ether was 60.6 mN/m, and the work of adhesion between ladder-type hydrogen silsesquioxane and the coating layer was 30.9 mN/m. Accordingly, the work of adhesion between the coating layer and ladder-type hydrogen silsesquioxane was smaller than the work of adhesion between the coating layer and propylene glycol dimethyl ether.

Figure 10D:
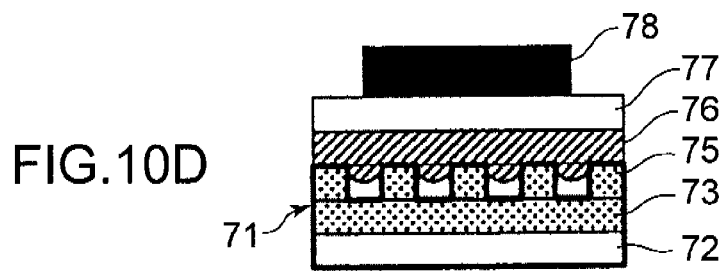

Then, as shown in FIG. 10D, a quartz substrate 77 of 30 mm×30 mm was placed, with the solution 76 being applied between the quartz substrate 77 and the mold 71. Then, a load 78 of 50 g was applied to the quartz substrate 77 to dry the solvent for 30 minutes. Thus, the solvent was removed from the solution, and a surface portion 79 composed of a constructional material was formed.

Figure 10E:
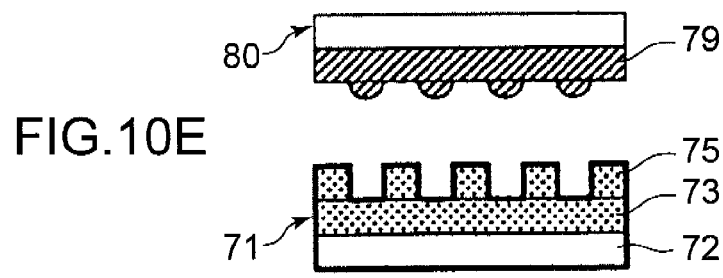

Lastly, the mold 71 was released. Specifically, as shown in FIG. 10E, the mold 71 was released from a substrate 80 having the surface portion 79. Since chargeability of the surface portion 79 was insufficient, the depth of the concaves of the surface portion 79 was as small as about one-half of the height of the corresponding convexes of the mold, and the cross section of the concaves had an elliptical shape with round corners. The method for checking a defect was the same as used in Example 1.

Comparative Example 3

A substrate as shown in FIGS. 11A through 11D was fabricated.

Figure 11A:
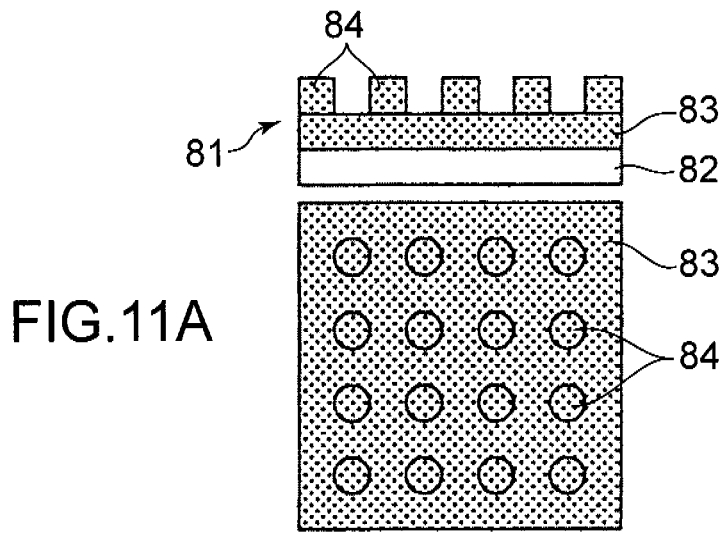
FIGS. 11A through 11D are diagrams showing a substrate manufacturing method as Comparative Example 3.
Figure 11B:
Figure 11C:
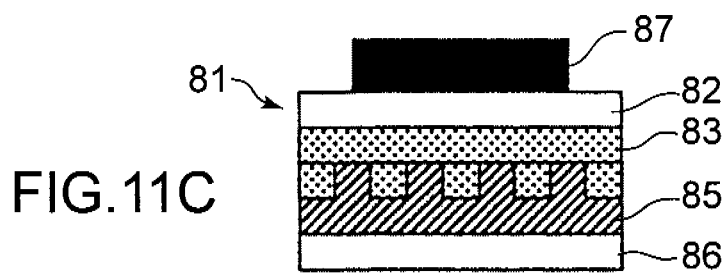

Firstly, a mold 81 as shown in FIG. 11A was prepared. Specifically, the mold 81 was the same as used in Example 6. Accordingly, a contact portion 83 was made of quartz.

Figure 11D:
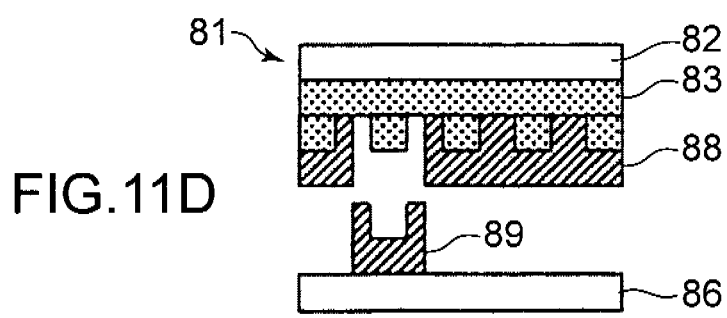

A substrate was fabricated by the same manner as used in Example 1. As a result of fabrication, as shown in FIG. 11D, about 90 percentages of the imprint material after drying remained on the mold 81 at the time of mold releasing, and it was impossible to fabricate a substrate having concave and convex configurations. The method for checking a defect was the same as used in Example 1.

The contact angle of quartz with respect to methylisobutylketone was about 30°. The surface tension of quartz is mainly composed of a hydrogen bond component. Although methylisobutylketone has a polar component, methylisobutylketone mainly has a dispersion component. Accordingly, it is conceived that the work of adhesion between quartz and methylisobutylketone is small, based on the equation (11). On the other hand, cage-type hydrogen silsesquioxane has a large amount of hydrogen bond component. Accordingly, it is conceived that the work of adhesion between quartz having a hydrogen bond component, and cage-type hydrogen silsesquioxane is large, based on the equation (11). Thus, it is conceived that the work of adhesion between quartz and cage-type hydrogen silsesquioxane is larger than the work of adhesion between quartz and methylisobutylketone.

Actually, the work of adhesion between quartz and methylisobutylketone was 152.8 mN/m, and the work of adhesion between cage-type hydrogen silsesquioxane and quartz was 412.4 mN/m. Accordingly, the work of adhesion between quartz and cage-type hydrogen silsesquioxane was larger than the work of adhesion between quartz and methylisobutylketone.

Comparative Example 4

A substrate was fabricated as shown in FIGS. 12A through 12E.

Firstly, a mold 91 as shown in FIG. 12A was prepared. Specifically, the mold 91 was the same as used in Example 6. Then, a mold releasing process was performed by coating a fluorine-based parting agent under the tradename of Optool DSX (produced by Daikin Kogyo Co., Ltd.) on the mold 91 by a dip-coating method. As a result of the coating, a coating layer 95 was formed on the mold 91, as shown in FIG. 12B.

A substrate was fabricated by the same method as used in Example 4. Specifically, as shown in FIG. 12C, 40 µl of the solution 96 was coated on a quartz substrate 97 of 30 mm×30 mm by a dispenser. Then, as shown in FIG. 12D, the mold 91 was placed, with the solution 96 being applied between the quartz substrate 97 and the mold 91. Then, a load 98 of 50 g was applied to the mold 91 to dry the solvent for 30 minutes. Thus, the solvent was removed from the solution, and a surface portion 99 composed of a constructional material was formed. The contact angle of the coating layer 95 with respect to methylisobutylketone (solvent of the solution 96) was about 100°. Accordingly, the solution 96 was repelled on the coating layer 95, and chargeability of the surface portion 99 was insufficient. Coating a fluorine-based parting agent on the mold to form a coating layer made the contact angle of 90° or larger. The relation between the works of adhesion with respect to the coating layer is as described below.

Actually, the work of adhesion between the coating layer and methylisobutylketone was 97.6 mN/m, and the work of adhesion between cage-type hydrogen silsesquioxane and the coating layer was 28.3 mN/m. Accordingly, the work of adhesion between the coating layer and cage-type hydrogen silsesquioxane was smaller than the work of adhesion between the coating layer and methylisobutylketone.

Lastly, the mold 91 was released. Specifically, as shown in FIG. 12E, the mold 91 was released from a substrate 100 provided with the surface portion 99. Since chargeability of the surface portion 99 was insufficient, the depth of the concaves of the surface portion 99 was as small as about one-half of the height of the corresponding convexes of the mold, and the cross section of the concaves had an elliptical shape with round corners. The method for checking a defect was the same as used in Example 1.

As described above, in the case where molds satisfying the requirements that the contact angle of a contact portion of the mold to be contacted with the solution is smaller than 90° with respect to the solvent, and that the work of adhesion W1 between the contact portion and the constructional material is smaller than the work of adhesion W2 between the contact portion and the solvent were used (Examples 1 through 7), no defect was found on the concave and convex configurations to be formed on the substrates, and no imprint material remained on the molds.

On the other hand, in the case where molds in which the work of adhesion W1 between the contact portion and the constructional material is larger than the work of adhesion W2 between the contact portion and the solvent were used (Comparative Examples 1 and 3), the imprint material remained on the molds, or it was impossible to manufacture a substrate having intended concave and convex configurations. Further, in the case where a mold releasing process was performed (Comparative Examples 2 and 4), although the imprint material hardly remained on the molds, it was impossible to manufacture a substrate having intended concave and convex configurations.

The specification discloses the aforementioned arrangements. The following is a summary of the main arrangements of the embodiment.

A substrate manufacturing method according to an aspect of the invention is a method for manufacturing a substrate provided with a surface portion having a plurality of concave and convex configurations. The substrate manufacturing method includes a step of applying a solution between a mold having a configuration corresponding to the concave and convex configurations, and a substrate base member, the solution being obtained by dissolving a constructional material for composing the surface portion in a solvent; a step of forming the surface portion by drying the solvent in a state that the solution is applied between the mold and the substrate base member; and a step of releasing the mold from the surface portion, wherein the mold satisfies requirements that a contact angle of a contact portion of the mold to be contacted with the solution is smaller than 90° with respect to the solvent, and that a work of adhesion between the contact portion and the constructional material is smaller than a work of adhesion between the contact portion and the solvent.

With the above arrangement, since the contact angle of the contact portion with respect to the solvent is smaller than 90°, it is possible to sufficiently charge the solution, which is an imprint material before drying, into the concave and convex configurations of the mold. Further, since the work of adhesion between the contact portion and the constructional material is smaller than the work of adhesion between the contact portion and the solvent, it is possible to easily release the mold from the surface portion composed of the constructional material, which is an imprint material after drying. Accordingly, the above arrangement enables, in the nano imprint method, to satisfy both of the requirements on chargeability and mold releasability, without providing an additional step such as a mold releasing process. Further, since there is no need of providing an additional step such as a mold releasing process, high throughput can be realized.

Conceivably, the above advantage is obtained based on the following findings. The primary component of the solution is the solvent, before the solvent is dried. Accordingly, chargeability of the solution into the concave and convex configurations of the mold can be changed depending on the compatibility between the contact portion and the solvent. If the contact angle of the contact portion with respect to the solvent is smaller than 90°, generally, a state between the contact portion and the solvent is an immersional wetting state, and the solution is well wet and spread over the contact portion. Accordingly, chargeability of the solution can be sufficiently enhanced.

Further, the primary component of the solution is the constructional material, after the solvent in the solution is dried. Accordingly, releasability of the mold can be changed depending on the compatibility between the contact portion and the constructional material. If the work of adhesion between the contact portion and the constructional material is smaller than the work of adhesion between the contact portion and the solvent, affinity of the solution, which is an imprint material before drying, for the contact portion is high, because the contact angle of the contact portion with respect to the solvent is smaller than 90°. However, after the solvent is dried, it is easy to remove the constructional material, which is an imprint material after drying, from the contact portion. Specifically, as far as the works of adhesion satisfy the above requirement, it is possible to easily remove a surface portion composed of the constructional material from a mold, without using e.g. a parting agent.

According, using a contact portion, a constructional material, and a solvent that satisfy the above requirements on the contact angle and the works of adhesion enables to satisfy both of the requirements on chargeability and mold releasability in the nano imprint method, without providing an additional step such as a mold releasing process.

Further, in the above manufacturing method, preferably, the contact portion may be made of a resin, the solvent may be an organic solvent, and the constructional material may be a silicon compound. Further preferably, the contact portion may be made of a material of at least one kind selected from the group consisting of acrylic resin, cellulosic resin, polycarbonate resin, polyolefin resin, and polystyrene resin; the solvent may be at least one kind selected from the group consisting of ketones and ethers, and the constructional material may be a silicon compound. Use of the above combination is more advantageous in satisfying both of the requirements on chargeability and mold releasability.

A substrate according to another aspect of the invention is manufactured by the above manufacturing method. With the above arrangement, a substrate having intended concave and convex configurations is obtained.

A magnetic recording medium according to yet another aspect of the invention includes the substrate, and a magnetic layer formed on the substrate, wherein the concave and convex configurations of the surface portion of the substrate are such that convexes or concaves are orderly arranged. With the above arrangement, it is possible to obtain, on a substrate having intended concave and convex configurations, a magnetic recording medium formed with a magnetic layer having a configuration corresponding to the intended concave and convex configurations. Thus, a high-density magnetic recording medium is obtained.

According to the invention, it is possible, in the nano imprint method, to provide a substrate manufacturing method that enables to satisfy both of the requirements on chargeability and mold releasability, without providing an additional step such as a mold releasing process. Further, according to the invention, there are provided a substrate manufactured by the substrate manufacturing method, and a magnetic recording medium incorporated with the substrate.

This application is based on Japanese Patent Application No. 2008-213815 filed on Aug. 22, 2008, the contents of which are hereby incorporated by reference.

Although the present invention has been adequately and fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A nano imprint method of manufacturing a substrate with a surface portion having concave and convex configurations, the method comprising the steps of:
   preparing a base member for the substrate and a mold, with a solution being applied therebetween, said mold having a surface in a shape corresponding to the concave and convex configurations of the substrate, said solution comprising a solvent and a constructional material for forming the surface portion, the constructional material being dissolved in the solvent;
   drying and removing the solvent in a state that the solution is applied between the base member and the mold, thereby forming the surface portion composed of the constructional material on the base member, the surface portion carrying transferred concave and convex configurations; and
   releasing the mold from the surface portion formed on the base member after drying and removing the solvent,
   wherein a material of a contact portion of the mold to be contacted with the solution and a material for the solvent and the constructional material, respectively, are selected for chargeability and releasability such that a contact angle of the contact portion of the mold with respect to the solvent is smaller than 90 degrees and a work of adhesion between the contact portion of the mold and the constructional material is smaller than a work of adhesion between the contact portion of the mold and the solvent,
   wherein the contact portion of the mold comprises a resin, the solvent comprises an organic solvent, and the constructional material comprises a silicon compound,
   wherein the resin is at least one selected from a group of acrylic, cellulosic, polycarbonate, polyolefin and polystyrene resin, and the solvent is at least one selected from a group of ketone and ether, and
   wherein the solution is deposited on the mold and pressed by the base member.

2. The method of claim 1, wherein the silicon compound is silicate or siloxane.

3. The method of claim 1, wherein the contact portion comprises a plurality of cylindrical-column shaped convexes having a pitch of about 360 nm, a height of about 200 nm, and a diameter of about 180 nm.

4. The method of claim 1, wherein the contact angle of the contact portion of the mold with respect to the solvent is greater than 20 degrees and smaller than 90 degrees.

5. The method of claim 1, wherein the resin is polyolefin, the solvent is ether, and the silicon compound is siloxane.

6. The method of claim 1, wherein the resin is polyolefin, the solvent is ether, and the silicon compound is silicate.

7. A nano imprint method of manufacturing a substrate with a surface portion having concave and convex configurations, the method comprising the steps of:
   preparing a base member for the substrate and a mold, with a solution being applied therebetween, said mold having a surface in a shape corresponding to the concave and convex configurations of the substrate, said solution comprising a solvent and a constructional material for forming the surface portion, the constructional material being dissolved in the solvent;
   drying and removing the solvent in a state that the solution is applied between the base member and the mold, thereby forming the surface portion composed of the constructional material on the base member, the surface portion carrying transferred concave and convex configurations; and
   releasing the mold from the surface portion formed on the base member after drying and removing the solvent,
   wherein a material of a contact portion of the mold to be contacted with the solution and a material for the solvent and the constructional material, respectively, are selected for chargeability and releasability such that a contact angle of the contact portion of the mold with respect to the solvent is smaller than 90 degrees and a work of adhesion between the contact portion of the mold and the constructional material is smaller than a work of adhesion between the contact portion of the mold and the solvent,
   wherein the contact portion of the mold comprises a resin, the solvent comprises an organic solvent, and the constructional material comprises a silicon compound,
   wherein the resin is at least one selected from a group of acrylic, cellulosic, polycarbonate, polyolefin and polystyrene resin, and the solvent is at least one selected from a group of ketone and ether, and
   wherein the solution is deposited on the base member and pressed by the mold.

8. The method of claim 7, wherein the silicon compound is silicate or siloxane.

9. The method of claim 7, wherein the contact portion comprises a plurality of cylindrical-column shaped convexes having a pitch of about 360 nm, a height of about 200 nm, and a diameter of about 180 nm.

10. The method of claim 7, wherein the contact angle of the contact portion of the mold with respect to the solvent is greater than 20 degrees and smaller than 90 degrees.

11. The method of claim 7, wherein the resin is polyolefin, the solvent is ether, and the silicon compound is siloxane.

12. The method of claim 7, wherein the resin is polyolefin, the solvent is ether, and the silicon compound is silicate.

13. A nano imprint method of manufacturing a substrate with a surface portion having concave and convex configurations, the method comprising the steps of:
   preparing a base member for the substrate and a mold, with a solution being applied therebetween, said mold having a surface in a shape corresponding to the concave and convex configurations of the substrate, said solution comprising a solvent and a constructional material for forming the surface portion, the constructional material being dissolved in the solvent;
   drying and removing the solvent in a state that the solution is applied between the base member and the mold, thereby forming the surface portion composed of the constructional material on the base member, the surface portion carrying transferred concave and convex configurations; and
   releasing the mold from the surface portion formed on the base member after drying and removing the solvent,
   wherein a material of a contact portion of the mold to be contacted with the solution and a material for the solvent and the constructional material, respectively, are selected for chargeability and releasability such that a contact angle of the contact portion of the mold with respect to the solvent is smaller than 90 degrees and a work of adhesion between the contact portion of the mold and the constructional material is smaller than a work of adhesion between the contact portion of the mold and the solvent,
   wherein the contact portion of the mold comprises a resin, the solvent comprises an organic solvent, and the constructional material comprises a silicon compound,
   wherein the resin is at least one selected from a group of acrylic, cellulosic, polycarbonate, polyolefin and polystyrene resin, and the solvent is at least one selected from a group of ketone and ether, and
   wherein the surface portion composed of the constructional material is removed from the mold without using a parting agent.

14. The method of claim 13, wherein the silicon compound is silicate or siloxane.

15. The method of claim 13, wherein the contact portion comprises a plurality of cylindrical-column shaped convexes having a pitch of about 360 nm, a height of about 200 nm, and a diameter of about 180 nm.

16. The method of claim 13, wherein the contact angle of the contact portion of the mold with respect to the solvent is greater than 20 degrees and smaller than 90 degrees.

17. The method of claim 13, wherein the resin is polyolefin, the solvent is ether, and the silicon compound is siloxane.

18. The method of claim 13, wherein the resin is polyolefin, the solvent is ether, and the silicon compound is silicate.

* * * * *